United States Patent [19]
Seyama et al.

[11] Patent Number: 6,156,834
[45] Date of Patent: Dec. 5, 2000

[54] POLYACETAL RESIN COMPOSITION

[75] Inventors: Toshiharu Seyama; Mikio Oka, both of Kurashiki; Makoto Doki, Okayama-ken, all of Japan

[73] Assignee: Asahi Kasei Kogyo Kabushiki Kaisha, Osaka, Japan

[21] Appl. No.: 09/271,351

[22] Filed: Mar. 17, 1999

[30] Foreign Application Priority Data

Mar. 20, 1998 [JP] Japan .................................. 10-072453

[51] Int. Cl.⁷ ..................................................... C08K 5/09
[52] U.S. Cl. .......................... 524/321; 524/322; 524/400; 524/593
[58] Field of Search .................................. 524/321, 322, 524/397, 400, 593

[56] References Cited

U.S. PATENT DOCUMENTS 5,212,222  5/1993  Mitsuuchi et al. ...................... 524/230

FOREIGN PATENT DOCUMENTS

| | | |
|---|---|---|
| 49-066747 | 6/1974 | Japan . |
| 49-104940 | 10/1974 | Japan . |
| 50-046756 | 4/1975 | Japan . |
| 53-031900 | 9/1978 | Japan . |
| 55-5934 | 1/1980 | Japan . |
| 55-021778 | 6/1980 | Japan . |
| 55-022508 | 6/1980 | Japan . |
| 56-18640 | 2/1981 | Japan . |
| 57-102943 | 6/1982 | Japan . |
| 57-128740 | 8/1982 | Japan . |
| 59-96157 | 6/1984 | Japan . |
| 59-179653 | 10/1984 | Japan . |
| 59-179654 | 10/1984 | Japan . |
| 59-179655 | 10/1984 | Japan . |
| 59-179656 | 10/1984 | Japan . |
| 59-179657 | 10/1984 | Japan . |
| 59-179658 | 10/1984 | Japan . |
| 59-179659 | 10/1984 | Japan . |
| 60-084348 | 5/1985 | Japan . |
| 60-104151 | 6/1985 | Japan . |
| 60-104153 | 6/1985 | Japan . |
| 60-056748 | 12/1985 | Japan . |
| 61-31453 | 2/1986 | Japan . |
| 62-4422 B2 | 1/1987 | Japan . |
| 63-260949 | 10/1988 | Japan . |
| 63-295661 | 12/1988 | Japan . |
| 267352 | 3/1990 | Japan . |
| 2-166151 | 6/1990 | Japan . |
| 2-209944 | 8/1990 | Japan . |
| 2-263856 | 10/1990 | Japan . |
| 314857 | 1/1991 | Japan . |
| 314859 | 1/1991 | Japan . |
| 339351 | 2/1991 | Japan . |
| 347819 | 2/1991 | Japan . |
| 463857 | 2/1992 | Japan . |
| 5-156118 | 6/1993 | Japan . |
| 5279550 | 10/1993 | Japan . |
| 06-009854 | 1/1994 | Japan . |
| 6107900 | 4/1994 | Japan . |
| 06293856 | 10/1994 | Japan . |
| 06293857 | 10/1994 | Japan . |
| 07003117 | 1/1995 | Japan . |
| 07011101 | 1/1995 | Japan . |
| 07018157 | 1/1995 | Japan . |
| 07026111 | 1/1995 | Japan . |
| 07033953 | 2/1995 | Japan . |
| 07173368 | 7/1995 | Japan . |
| 07173369 | 7/1995 | Japan . |
| 07196889 | 8/1995 | Japan . |
| 07331028 | 12/1995 | Japan . |
| 2677849 B2 | 11/1997 | Japan . |

*Primary Examiner*—V. P. Hoke

[57] ABSTRACT

The present invention provides a polyacetal resin composition improved, when molded, in environmental stress cracking resistance and in the physical properties of the weld portion. Environmental stress cracking resistance and physical properties of the weld portion before a heat aging resistance test can be improved by adding, to 100 parts by weight of a polyacetal resin, 0.001 to 1.0 part by weight of a difatty acid alkaline earth metal salt produced using two or more kinds of fatty acid and an alkaline earth metal. Also, the physical properties of the weld portion after a heat aging resistance test can be improved by further adding particular fatty acid ester compounds.

11 Claims, 2 Drawing Sheets

POLYACETAL RESIN COMPOSITION

BACKGROUND OF THE INVENTION

The present invention relates to a polyacetal resin composition which is improved, when molded, in environmental stress cracking resistance (hereinafter referred to as ESCR) and in the physical properties of the weld portion and yet maintains the excellent moldability of polyacetal resin.

Polyacetal resins are highly balanced in mechanical strengths, impact resistance and sliding properties, are easy to process, and therefore, are widely used as a representative engineering plastic mainly in parts of electric or electronic appliances, automobile parts, and other mechanical parts. Many polyacetal resin molded articles are molded articles which are produced by insert molding or the like, and wherein strain may remain; or those parts which undergo stress continuously or repeatedly, such as the inside door handle of automobile, gear of an electronic appliance or the like. Most of these polyacetal resin molded articles are produced by multiple-gate molding and accordingly have a weld portion.

As polyacetal resins have come to be used in wider applications as above, the environment of their use have become diverse; therefore, it has become necessary for polyacetal resins to have improved performance. While ESCR referred to in the present invention is an important property for polyacetal resins, there has been no generally known method for improvement of the ESCR of polyacetal resin. Based on the literature on other resins, it is anticipated that the ESCR of polyacetal resin can be improved by allowing a polyacetal resin to have a higher molecular weight. However, allowing a polyacetal resin to have a higher molecular weight poses problems. For example, reduction in flowability, particularly in injection molding (e.g. reduced processability in multiple-cavity molding or thin material molding) may result.

Use of a metal salt of a fatty acid in polyacetal resin is described in JP-B-43-006101, JP-B-46-035980, JP-B-47-004943, JP-B-47-010531, JP-B-48-017378, JP-A-49-066747, JP-A-49-104940, JP-B-55-021778, JP-B-55-022508, JP-A-57-102943, JP-A-59-096157, JP-A-59-179653, JP-A-59-179654, JP-A-59-179655, JP-A-59-179656, JP-A-59-179657, JP-A-59-179658, JP-A-59-179659, JP-A-60-084348, JP-B-60-056748, JP-B-62-004422, JP-B-62-058387, JP-A-63-260949, JP-A-2-067352, JP-A-2-166151, JP-A-2-209944, JP-A-3-014857, JP-A-3-014859, JP-A-3-039351, JP-A-3-047819, JP-A-4-063857, JP-A-5-156118, JP-A-5-279550, JP-A-6-009854, JP-A-7-003117, JP-A-7-026111, JP-A-7-033953, JP-A-7-173368, JP-A-7-173369, JP-A-7-196889, JP-A-7-248162, JP-A-7-331028, WO 97/12937, Japanese Patent Publication No. 2677849, etc.

In the above literature, no mention is made of the use, in a polyacetal resin, of a difatty acid alkaline earth metal salt (referred to as component (B) in some places of the present specification) produced using two or more kinds of fatty acids and an alkaline earth metal. In the above-mentioned JP-A-2-067352, JP-A-2-166151 and Japanese Patent Publication No. 2677849, resin compositions comprising at least one kind of fatty acid alkaline earth metal salt are described, and the use of calcium stearate and calcium palmitate in combination is shown in their Examples. However, the difatty acid alkaline earth metal salts mentioned in the literature are the ones produced using only one kind of fatty acid, and it is not described in the literature that a difatty acid alkaline earth metal salt can be produced using two or more kinds of fatty acids.

In a series of JP-A-59-179653 to JP-A-59-179659, JP-B-62-004422 and JP-A-3-039351 mentioned above, a combination use of a difatty acid alkaline earth metal salt and a fatty acid is suggested; however, no Example of the combination use is given, and only the possibility of the combination use is mentioned. In fact, in the literature it is not described that the combination use of a particular difatty acid alkaline earth metal salt (B) and a particular fatty acid (C), which is employed in the present invention, can strikingly improve the ESCR and physical properties of weld portion of polyacetal resin molded article.

Many molded articles produced in multiple-gating have a weld portion. In such polyacetal resin molded articles, the physical properties of the weld portion are of importance. For instance, when a molded article having a weld portion has been subjected to aging at high temperatures, the physical properties of the weld portion are far inferior to those of the non-weld portion, and therefore, the physical property retention of the weld portion is important in designing a product. However, no effort has been made to improve the physical properties of the weld portion of a polyacetal resin molded article.

The heat aging resistance of polyacetal resin is generally improved by adding a fatty acid metal salt to a polyacetal resin as mentioned above. In the above-mentioned JP-B-55-022508, JP-A-2-209944 and JP-A-7-003117, for example, it is disclosed to add a fatty acid metal salt to a polyacetal resin to improve the heat aging resistance of the latter.

In this approach, the heat aging resistance of the non-weld portion is improved. However, the physical properties of the weld portion after aging are not fully satisfactory as compared with those of the non-weld portion.

The use of a fatty acid ester and fatty acid in polyacetal resin is disclosed. For example, polyacetal resin compositions obtained by adding, to a polyacetal resin, a fatty acid ester derived from a fatty acid and a polyhydric alcohol are disclosed in JP-B-53-031900, JP-A-60-104153, JP-A-2-263856, JP-B-5-018864, JP-B-5-035186, JP-A-6-107900, JP-A-6-293857, JP-A-7-018157 and Japanese Patent Publication No. 2522302.

Also, polyacetal resin compositions obtained by adding a hydroxyl group-containing fatty acid ester to a polyacetal resin are disclosed in JP-A-50-046756, JP-B-56-052940, JP-A-57-128740, JP-A-6-293856 and JP-A-7-011101.

Polyacetal resin compositions obtained by adding a fatty acid ester and a metal salt of a fatty acid to a polyacetal resin are disclosed in JP-B-63-002297, JP-A-4-063857, JP-A-7-173368, JP-A-7-196889 and JP-A-7-331028.

In any of the above approaches, however, the physical properties of the weld portion when the resulting polyacetal resin molded article has been tested for heat aging resistance, are not fully satisfactory as compared with the properties of the non-weld portion. Therefore, improvement on this point has been strongly needed.

In recent years, as the application of polyacetal resins have become wider, it has been found that polyacetal resins are deteriorated, in some cases, owing to acid rain or an acid generated in a small amount when a halogen group-containing resin is heated or the like.

SUMMARY OF THE INVENTION

The present invention provides a polyacetal resin composition which, when molded, is improved in ESCR, particularly in an acidic atmosphere, and is improved in the physical properties of the weld portion before and after heat aging resistance test, and yet maintains the excellent moldability of polyacetal resin.

The present inventors made a study in order to achieve the above object. As a result, the present inventors have found that, by adding to a polyacetal resin (A), a difatty acid alkaline earth metal salt (B), which is produced using two or more kinds of fatty acids and an alkaline earth metal, and a fatty acid (C), the ESCR and the physical properties of the weld portion of the resulting polyacetal resin composition are simultaneously and strikingly improved, and moreover that by further adding a fatty acid diester compound (D), represented by the following general formula (I), and a fatty acid monoester compound (E), represented by the following general formula (II), the physical properties of the weld portion after a heat aging resistance test can be improved:

$$R_1\text{—COO}(R_3O)_n\text{—COR}_2 \quad (I)$$

wherein $R_1$ and $R_2$ may be the same or different and are each an alkyl group, an alkenyl group, an alkyl group substituted with one hydroxyl group or an alkenyl group substituted with one hydroxyl group, and wherein each alkyl or alkenyl group contains 9 to 35 carbon atoms; $R_3O$ is an alkylene glycol unit having 2 to 6 carbon atoms; and n is an integer of 1 to 70;

$$R_4\text{—COO}(R_5O)_m\text{—H} \quad (II)$$

wherein $R_4$ is an alkyl group, an alkenyl group, an alkyl group substituted with one hydroxyl group or an alkenyl group substituted with one hydroxyl group, and wherein each alkyl or alkenyl group contains 9 to 35 carbon atoms; $R_5O$ is an alkylene glycol unit having 2 to 6 carbon atoms; and m is an integer of 1 to 70.

The present invention has been completed based on the above findings.

The present invention is as follows.

(1) A polyacetal resin composition comprising 100 parts by weight of a polyacetal resin (A), 0.001 to 1.0 part by weight of a difatty acid alkaline earth metal salt (B) produced using two or more kinds of fatty acids and an alkaline earth metal, and $1\times10^{-6}$ to $1\times10^{-1}$ part by weight of a fatty acid (C).

(2) A polyacetal resin composition according to the above (1), wherein the weight ratio (C/B) of the fatty acid (C) and the difatty acid alkaline earth metal salt (B) is 0.1/100 to 10/100.

(3) A polyacetal resin composition according to the above (1), wherein the fatty acid (C) is a combination of two or more kinds of fatty acids.

(4) A polyacetal resin composition according to the above (1), wherein the fatty acid (C) is a combination of at least one kind of fatty acid having odd-number carbon atoms and at least one kind of fatty acid having even-number carbon atoms, and the weight ratio (C1/C2) of the total weight (C1) of the fatty acid having odd-number carbon atoms and the total weight (C2) of the fatty acid having even-number carbon atoms is 0.1/99.9 to 99.9/0.1.

(5) A polyacetal resin composition according to any of the above (1) to (4), wherein the fatty acid (C) is at least one kind selected from the fatty acids used in production of the difatty acid alkaline earth metal salt (B).

(6) A polyacetal resin composition according to any of the above (1) to (5), wherein the fatty acids of the difatty acid alkaline earth metal salt (B) are a combination of at least one kind of fatty acid having even-number carbon atoms and at least one kind of fatty acid having odd-number carbon atoms and the weight ratio (B1/B2) of the total weight (B1) of the fatty acid having even-number carbon atoms and the total weight (B2) of the fatty acid having odd-number carbon atoms is 0.1/99.9 to 99.9/0.1.

(7) A polyacetal resin composition according to any of the above (1) to (6), wherein the metal moiety of the difatty acid alkaline earth metal salt (B) is calcium and the fatty acid moiety is at least two kinds selected from the group consisting of lauric acid, tridecylic acid, myristic acid, pentadecylic acid, palmitic acid, heptadecylic acid, stearic acid, nonadecanoic acid, arachic acid and behenic acid.

(8) A polyacetal resin composition according to the above (1), further comprising a fatty acid diester compound (D) represented by the following general formula (I) and a fatty acid monoester compound (E) represented by the following general formula (II):

$$R_1\text{—COO}(R_3O)_n\text{—COR}_2 \quad (I)$$

wherein $R_1$ and $R_2$ may be the same or different and are each an alkyl group, an alkenyl group, an alkyl group substituted with one hydroxyl group or an alkenyl group substituted with one hydroxyl group, and wherein each alkyl or alkenyl group contains 9 to 35 carbon atoms; $R_3$ is an alkyl group containing 2 to 6 carbon atoms such that $R_3O$ is an alkylene glycol unit containing 2 to 6 carbon atoms; and n is an integer of 1 to 70, $$R_4\text{—COO}(R_5O)_m\text{—H} \quad (II)$$

wherein $R_4$ is an alkyl group, an alkenyl group, an alkyl group substituted with one hydroxyl group or an alkenyl group substituted with one hydroxyl group, and wherein each alkyl or alkenyl group contains 9 to 35 carbon atoms; $R_5$ is an alkyl group containing 2 to 6 carbon atoms such that $R_5O$ is an alkylene glycol unit containing 2 to 6 carbon atoms; and m is an integer of 1 to 70.

(9) A polyacetal resin composition according to the above (8), wherein the total amount of the fatty acid diester compound (D) and the fatty acid monoester compound (E) is 0.005 to 3.0 parts by weight per 100 parts by weight of the polyacetal resin and the weight ratio (D/E) of the fatty acid diester compound (D) and the fatty acid monoester compound (E) is 99.9/0.1 to 0.1/99.9.

(10) A polyacetal resin composition according to any of the above (1) to (9), wherein the amount of formaldehyde gas generated when the polyacetal resin composition is heated at 230° C. for 50 minutes in a nitrogen atmosphere is 500 ppm or less.

(11) A gear molded article comprising a polyacetal resin composition set forth in any of the above (1) to (10).

The present inventors have found that by adding to a polyacetal resin (A) a difatty acid alkaline earth metal salt (B), produced using two or more kinds of fatty acids and an alkaline earth metal, and a fatty acid (C) of a particular amount, the ESCR and the properties of the weld portion of the resulting polyacetal resin composition can be strikingly improved while the processability of polyacetal resin is maintained. The present inventors further have found that by using two or more kinds of fatty acids, particularly a combination of a fatty acid of even-number carbon atoms and a fatty acid of odd-number carbon atoms as the fatty acid (C), and/or using a combination of a fatty acid of even-number carbon atoms and a fatty acid of odd-number carbon atoms in production of the difatty acid alkaline earth metal salt (B), the ESCR and the physical properties of weld portion can be improved further. It has also been found that by further adding a particular fatty acid diester compound (D) and a particular fatty acid monoester compound (E), the heat aging resistance of the polyacetal resin can be strikingly improved and the physical properties of the weld portion can be maintained even after heat aging resistance test. The present invention has been completed based on the above findings.

PREFERRED EMBODIMENTS OF THE INVENTION

The polyacetal resin (A) referred to in the present invention can be a polyoxymethylene homopolymer obtained by applying a terminal stabilization treatment to an oxymethylene homopolymer consisting substantially of oxymethylene units which is produced from a formaldehyde monomer or a cyclic oligomer thereof such as trimer (trioxane), tetramer (tetraoxane) or the like; or a polyoxymethylene copolymer obtained by applying a terminal stabilization treatment to an oxymethylene-oxyalkylene copolymer containing 0.1 to 20% by weight of oxyalkylene units each having 2 to 8 carbon atoms which is produced from the above-mentioned monomer or cyclic oligomer and a comonomer such as ethylene oxide, propylene oxide, epichlorohydrin, 1,3-dioxolane, 1,4-butanediol, cyclic formal (e.g. formal of glycol or diglycol) or the like. The polyacetal resin of the present invention may also be an oxymethylene-oxyalkylene copolymer having a molecular chain of branched structure, or an oxymethylene-based block copolymer containing 50% by weight or more of polyoxymethylene (POM) blocks and 50% by weight or less of polymer blocks different from the POM blocks containing 50% by weight or more of oxymethylene repeating units. The present polyacetal resin is preferably a polyoxymethylene copolymer having oxymethylene-oxyalkylene units produced using 1,3-dioxolane as the comonomer.

In producing a polyacetal resin usable in the present invention, there is no particular restriction as to the process. The polyacetal resin can be produced by a known process, for example, the process disclosed in U.S. Pat. No. 2,998,409. When the polyacetal is, for example, a copolymer, it can be produced by copolymerizing trioxane and a cyclic ether (a comonomer) and subjecting the resulting copolymer to terminal stabilization using a twin-screw extruder or the like.

The polymerization is conducted by batch-wise or continuous bulk polymerization. In batch-wise polymerization, a reaction vessel with a stirrer can be generally used as the polymerization apparatus. In continuous polymerization, a self-cleaning type mixer such as cokneader, twin-screw type continuous extrusion kneader, twin-paddle type continuous mixer or the like can be used.

The polymerization is conducted under ordinary pressure at 60 to 200° C.

As the polymerization catalyst, there is generally used boron trifluoride, boron trifluoride hydrate, or a coordination complex compound between boron trifluoride and oxygen- or sulfur-containing organic compound. The polymerization catalyst is used in a gaseous state or as a solution in an appropriate organic solvent. The polymer obtained contains an active polymerization catalyst; therefore, it is desired to deactivate the polymerization catalyst.

The deactivation of the polymerization catalyst is conducted by pouring the polymerization mixture into an aqueous or organic solvent solution containing a basic substance. The deactivation may also be conducted by adding a basic substance to a polyacetal resin before terminal stabilization and melting the resulting mixture using an extruder to deactivate the catalyst. The basic substance used for deactivation includes, for example, nitrogen-containing compounds such as hindered amines, ammonia, triethylamine, tributylamine and the like.

The terminal stabilization of the polymer after the deactivation of the polymerization catalyst is conducted, for example, with a twin-screw extruder or the like that is capable of continuously conducting a series of operations for the terminal stabilization which comprise at least two steps, i.e. (1) the step of injecting a basic substance into a molten polyacetal resin, followed by kneading and (2) the step of releasing the vapor of the injected basic substance and free formaldehyde. By using the twin-screw extruder, the volatile components are removed from the molten polyacetal resin to conduct the terminal stabilization. The basic substance includes nitrogen-containing compounds such as ammonia, triethylamine, tributylamine and the like. Water may be used together with the basic substance.

The polyacetal resin is preferably the one which generates formaldehyde in an amount of 500 ppm or less when heated under particular conditions. The amount of formaldehyde gas generated from polyacetal resin can be determined by the following method. A polyacetal resin after terminal stabilization is placed in an aluminum-made container and then melted in a nitrogen atmosphere at 230° C. for 50 minutes; the formaldehyde gas generated thereby is allowed to be absorbed by an aqueous sodium sulfite solution; the resulting solution is titrated with 0.01 N sulfuric acid; the amount of formaldehyde gas generated is calculated from the amount of sulfuric acid used for titration.

The difatty acid alkaline earth metal salt (B) referred to in the present invention is a difatty acid alkaline earth metal salt produced using an alkaline earth metal compound and two or more kinds of fatty acids of chain structure selected from carboxylic acids (RCOOH) each having one carboxylic group and 10 to 36 carbon atoms. The metal moiety used in the difatty acid alkaline earth metal salt (B) is at least one metal selected from the group consisting of beryllium, calcium, magnesium, barium, zinc, aluminum, strontium and radium. Of these metals, calcium is particularly preferred in view of the improvements of ESCR and physical properties of weld portion.

The fatty acids used in the difatty acid alkaline earth metal salt (B) can be any of saturated fatty acids, unsaturated fatty acids and fatty acids substituted with hydroxyl groups. Saturated fatty acids are preferred. The fatty acids include capric acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid, ceroplastic acid, undecylenic acid, oleic acid, elaidic acid, cetoleic acid, erucic acid, brassidic acid, sorbic acid, linolic acid, lenoleic acid, arachidonic acid, propiolic acid, stearolic acid, 12-hydroxydodecanoic acid, 3-hydroxy decanoic acid, 16-hydroxyhexadecanoic acid, 10-hydroxyhexadecanoic acid, 12-hydroxyoctadecanoic acid, 10-hydroxy-8-octadecanoic acid, dl-erythro-9,10-dihydroxyoctadecanoic acid, etc. Of these fatty acids, preferred are lauric acid, tridecylic acid, myristic acid, pentadecylic acid, palmitic acid, heptadecylic acid, stearic acid, nonadecanoic acid, arachic acid and behenic acid. Particularly preferred are palmitic acid, heptadecylic acid and stearic acid.

The difatty acid alkaline earth metal salt (B) used in the present invention must be produced using, as mentioned above, two or more kinds of fatty acids. If two or more kinds of metal salts each containing two molecules of the same kind of fatty acid are mixed and used as difatty acid alkaline earth metal salts, such as two or more selected from calcium dipalmitate, calcium diheptadecylate, calcium distearate, etc., as seen in Comparative Examples 7, 8 and 12, then the improvements of ESCR and physical properties of weld portion are low. therefore, it is presumed that the difatty acid alkaline earth metal salt (B) produced using two or more kinds of fatty acids in admixture contains not only two or more kinds of metal salts each containing two molecules of the same kind of fatty acid, but also at least one kind of metal salt containing fatty acids of different numbers of carbon atoms, for example, calcium monopalmitate monoheptadecylate, calcium monopalmitate monostearate, calcium monoheptadecylate monostearate, etc., whereby great improvements are obtained in ESCR and physical properties of weld portion.

The two or more kinds of fatty acids used in production of the difatty acid alkaline earth metal salt (B) are preferably a combination of a fatty acid having even-number carbon atoms (B1, for example, stearic acid) and a fatty acid having odd-number carbon atoms (B2, for example, heptadecylic acid). The weight ratio (B1/B2) of the fatty acid (B1) and the fatty acid (B2) is 99.9/0.1 to 0.1/99.9, preferably 99/1 to 1/99.

Figure 2:
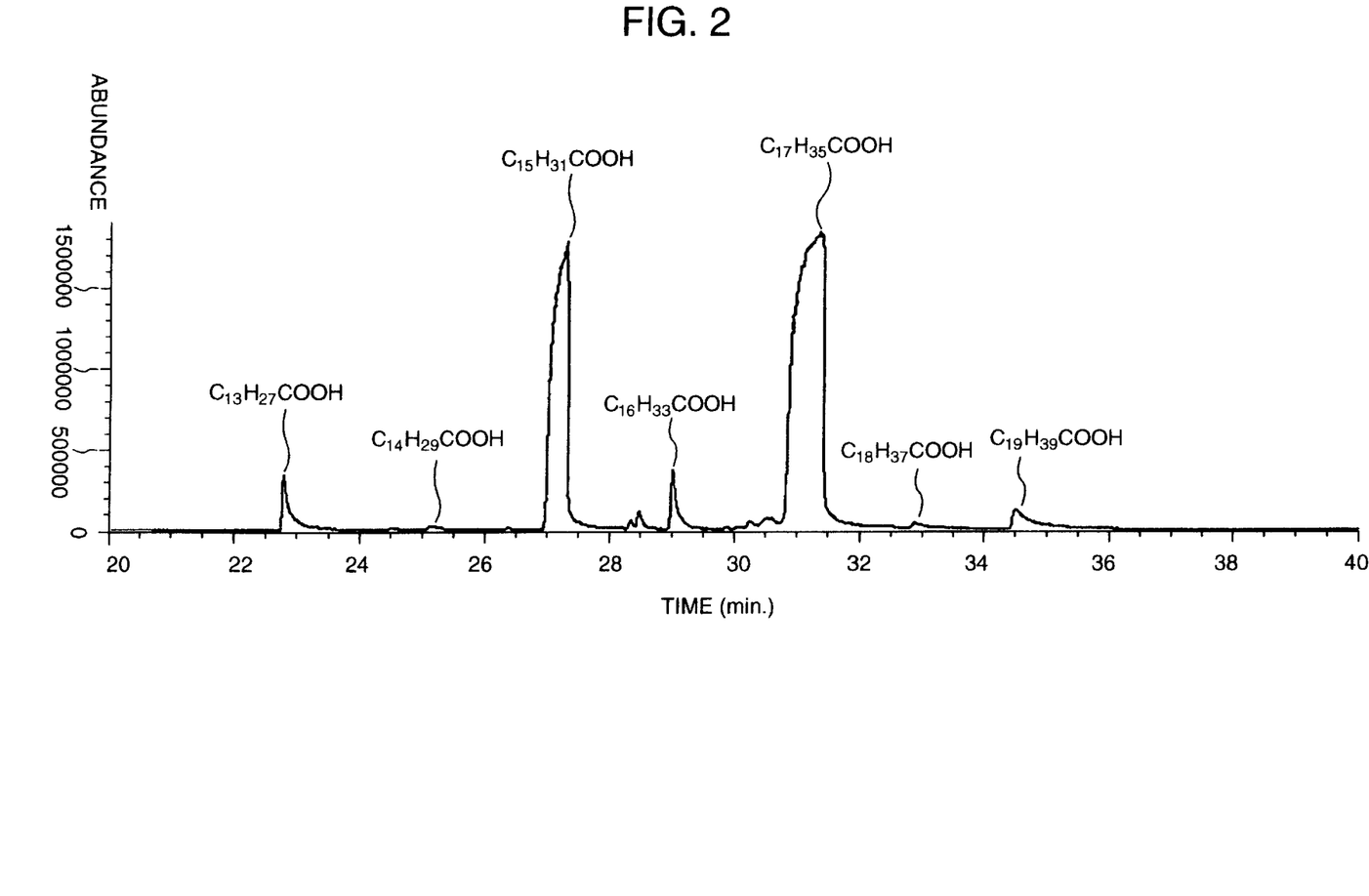
FIG. 2 is an analytical chart in which the fatty acids of odd-number carbon atoms and even-number carbon atoms were identified by GC-MS.

With respect to the fatty acid having odd-number carbon atoms, when, for example, an unpurified fatty acid obtained from beef tallow is analyzed by a gas chromatography mass spectrometer (GC-MS: HP5890+HP5971A, a product of Hewlett-Packard Co; column: DB-1 (inner diameter=0.25 mm, film thickness=0.25 μn, length=30 m); inlet temperature: 250° C.; detection area temperature: 280° C.; column temperature: 100° C. (10° C./min) 350° C.×50 min; carrier gas: He (50 ml/min, split ratio=30)), the presence of some fatty acids having odd-number carbon atoms can be confirmed as shown in FIG. 2. These fatty acids having an odd-number of carbon atoms could be isolated at a purity of 95% by weight or more by using size-exclusion liquid chromatography (LC-GPC: LC-908, a product of Nihon Bunseki Kogyo Co.; column: Shodex H-2001+H-2002).

The difatty acid alkaline earth metal salt (E) has no particular restriction as to the production. The difatty acid alkaline earth metal salt (B) used in the present invention can be obtained, for example, by producing a crude difatty acid alkaline earth metal salt by neutralization between fatty acids and metal hydroxide, double decomposition between fatty acids and metal chloride or neutralization between fatty acids and metal oxide and subjecting the crude metal salt to water washing and subsequent drying.

The difatty acid alkaline earth metal salt (B) preferably contains a substantially unreacted metal compound in an amount of 500 ppm or less. The unreacted metal compound in the difatty acid alkaline earth metal salt (B) can be determined by subjecting the metal salt (B) to an ultrasonic treatment, quantitatively determining the metal component present in the filtrate by the use of a conductivity detector, and converting the obtained value to the amount of the metal compound (metal hydroxide, metal oxide or metal chloride) used as a raw material in production of the difatty acid alkaline earth metal salt (B).

The amount of the difatty acid alkaline earth metal salt (B) used in the present polyacetal resin composition is 0.001 to 1.0 part by weight, preferably 0.01 to 0.5 part by weight per 100 parts by weight of the polyacetal resin. When the amount of the difatty acid alkaline earth metal salt (B) is less than 0.001 part by weight, the improvements of ESCR and the physical properties of the weld portion of the molded material are small. When the amount is more than 1.0 part by weight, the improvements of ESCR and the physical properties of the weld portion, of the molded material are small as well, or the thermal stability or color of the molded material are deteriorated. The amount of unreacted metal compound (metal oxide, metal hydroxide or metal chloride) present in the difatty acid alkaline earth metal salt (B) is preferably 500 ppm or less based on the difatty acid alkaline earth metal salt (B), in view of the thermal stability and color of molded material.

The fatty acid (C) referred to in the present invention is a fatty acid having 10 to 36 carbon atoms. The fatty acid (C) may be any of saturated fatty acids, unsaturated fatty acids and fatty acids substituted with hydroxyl group. Saturated fatty acids are preferred. Examples of the fatty acid (C) are capric acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid, ceroplastic acid, undecylenic acid, oleic acid, elaidic acid, cetoleic acid, erucic acid, brassidic acid, sorbic acid, linolic acid, lenoleic acid, arachidonic acid, propiolic acid, stearolic acid, 12-hydroxydodecanoic acid, 3-hydroxydecanoic acid, 16-hydroxyhexadecanoic acid, 10-hydroxyhexadecanoic acid, 12-hydroxyoctadecanoic acid. Of these fatty acids, preferred are lauric acid, tridecylic acid, myristic acid, pentadecylic acid, palmitic acid, heptadecylic acid, stearic acid, nonadecanoic acid and behenic acid.

In the present invention, at least one fatty acid selected from the above fatty acids can be used as the fatty acid (C). Combined use of two or more kinds of fatty acids is preferred because it can further improve the ESCR and physical properties of weld portion, of molded material. Particularly preferred is the combined use of at least one kind having odd-number carbon atoms (C1, for example, heptadecylic acid) and at least one kind of fatty acid having even-number carbon atoms (C2, for example, stearic acid). The weight ratio (C1/C2) of the fatty acids (C1) and (C2) used is 0.1/99.9 to 99.9/0.1, preferably 1/99 to 99/1. It is also preferable that the fatty acid (C) is the same as at least one kind selected from the fatty acids used in production of the difatty acid alkaline earth metal salt (B) to be used together with the fatty acid (C), in view of the improvements of the ESCR and physical properties of weld portion, of molded material.

The amount of the fatty acid (C) used in the present polyacetal resin composition is $1\times10^{-6}$ to $1\times10^{-1}$ part by weight per 100 parts by weight of the polyacetal resin. The fatty acid (C) is used, relative to the difatty acid alkaline earth metal salt (B), in a weight ratio (C/B) of preferably 0.1/100 to 10/100. Preferably, the difatty acid alkaline earth metal salt (B) and the fatty acid (C) are mixed with each other in advance and then used, because this is effective to observe the improvements of the ESCR and the physical propertie of weld portion of the molded material. The advance mixing can be made by an appropriate known method which is not particularly restricted.

The reason for the effect of combined use of the fatty acid (C) and the difatty acid alkaline earth metal salt (B) is not clear; however, it is presumed that, even with the addition of an amount of the components (B) and (C), plasticity, stress relaxation, etc. are obtained and improved, thereby reducing the strain of the molded material.

The fatty acid ester compounds referred to in the present invention are a fatty acid diester compound (D) represented by the following general formula (I) and a fatty acid monoester compound (E) represented by the following general formula (II), both obtained from a saturated or unsaturated fatty acid or a fatty acid substituted with hydroxyl group, and wherein each alkyl or alkenyl group contains 10 to 36 carbon atoms and an alkylene glycol containing 2 to 6 carbon atoms:

$$R_1-COO(R_3O)_nCOR_2 \quad (I)$$

wherein $R_1$ and $R_2$ may be the same or different and are each an alkyl group, an alkenyl group, an alkyl group substituted with one hydroxyl group or an alkenyl group substituted with one hydroxyl group, and wherein each alkyl or alkenyl group contains 9 to 35 carbon atoms; $R_3$ is an alkyl group containing 2 to 6 carbon atoms such that $R_3O$ is an alkylene glycol unit containing 2 to 6 carbon atoms; and n is an integer of 1 to 70;

$$R_4-COO(R_5O)_m-H \quad (II)$$

wherein $R_4$ is an alkyl group, an alkenyl group, an alkyl group substituted with one hydroxyl group or an alkenyl group substituted with one hydroxyl group, and wherein each alkyl or alkenyl group contains 9 to 35 carbon atoms; $R_5$ is an alkyl group containing 2 to 6 carbon atoms such that $R_5O$ is an alkylene glycol unit containing 2 to 6 carbon atoms; and m is an integer of 1 to 70.

The fatty acid diester compound (D) and the fatty acid monoester compound (E) are used in combination. The total amount of the fatty acid diester compound (D) and the fatty acid monoester compound (E) used in the present polyacetal resin composition is 0.005 to 3.0 parts by weight per 100 parts by weight of the polyacetal resin. The weight ratio (D/E) of the fatty acid diester compound (D) and the fatty acid monoester compound (E) is 99.9/0.1 to 0.1/99.9. The total amount of the compounds (D) and (E) is preferably 0.01 to 1.0 part by weight per 100 parts by weight of the polyacetal resin. The weight ratio (D/E) of the compound (D) and the compound (E) is preferably 9.9/0.1 to 50/50, more preferably 99.9/0.1 to 90/10.

When the total amount and weight ratio of the fatty acid diester compound (D) and the fatty acid monoester compound (E) are outside the above ranges, the resulting polyacetal resin molded material is not fully satisfactory in physical properties of the weld portion after a heat aging resistance test.

The fatty acid diester compound (D) and fatty acid monoester compound (E) referred to in the present invention are those fatty acid ester compounds which use, as a material for the fatty acid moiety, capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid, undecylenic acid, oleic acid, elaidic acid, cetoleic acid, erucic acid, brassidic acid, sorbic acid, linolic acid, lenoleic acid, arachidonic acid, propiolic acid, stearolic acid, 12-hydroxydodecanoic acid, 3-hydroxydecanoic acid, 16-hydroxyhexadecanoic acid, 10-hydroxyhexadecanoic acid, 12-hydroxyoctadecanoic acid, 10-hydroxy-8-octadecanoic acid, dl-erythro-9,10-dihydroxyoctadecanoic acid, etc. and, as a material for the alkylene glycol moiety, ethylene oxide, propylene oxide, butylene oxide, epichlorohydrin, styrene oxide, 2-methyltetrahydrofuran, oxepane, etc. In the compounds (D) and (E), the number of moles of alkylene glycol added is 1 to 70. The fatty acid diester compound (D) and the fatty acid monoester compound (E) are preferably those fatty acid ester compounds wherein the fatty acid is selected from myristic acid, pentadecylic acid, palmitic acid, heptadecylic acid and stearic acid and the alkylene glycol is (poly)ethylene glycol and wherein the number of moles of ethylene glycol added is 1 to 10. The moles of ethylene glycol added is more preferably 1 to 5.

Specific examples of the fatty acid diester compound (D) are (poly)ethylene glycol dimyristate, (poly)ethylene glycol dipentadecylate, (poly)ethylene glycol dipalmitate, (poly)ethylene glycol diheptadecylate, (poly)ethylene glycol distearate, (poly)ethylene glycol myristate palmitate, (poly)ethylene glycol myristate stearate, (poly)ethylene glycol palmitate stearate, (poly)ethylene glycol myristate pentadecylate, (poly)ethylene glycol myristate heptadecylate, (poly)ethylene glycol pentadecylate palmitate, (poly)ethylene glycol palmitate heptadecylate and (poly)ethylene glycol heptadecylate stearate.

Specific examples of the fatty acid monoester compound (E) are (poly)ethylene glycol monomyristate, (poly)ethylene glycol monopentadecylate, (poly)ethylene glycol monopalmitate, (poly)ethylene glycol monoheptadecylate and (poly)ethylene glycol monostearate.

Of the above-mentioned fatty acid diester compounds (D), preferred are ethylene glycol dimyristate, ethylene glycol dipalmitate, ethylene glycol distearate, ethylene glycol myristate palmitate, ethylene glycol myristate stearate and ethylene glycol palmitate stearate. Of the above-mentioned fatty acid monoester compounds (E), preferred are ethylene glycol monomyristate, ethylene glycol monopalmitate and ethylene glycol monostearate.

It is not clear why the addition of the fatty acid diester compound (D) and the fatty acid monoester compound (E) improves the physical properties of the weld portion of the molded material after a heat aging resistance test. However, it is presumed that the addition of the compounds (D) and (E) increases the plasticity of polyacetal resin composition and the increased plasticity brings about higher dispersion of the difatty acid alkaline earth metal salt (B), thereby improving the physical properties of the weld portion of the molded material after a heat aging resistance test.

The fatty acid diester compound (D) and the fatty acid monoester compound (E) are produced by subjecting raw materials, i.e. fatty acids and an alkylene glycol, to esterification by an acid catalyst method or a catalyst-free method. The reaction temperature and raw material concentrations (e.g. molar ratio) used in the esterification are appropriately determined depending upon the application purpose, and the fatty acid ester compounds formed are, if necessary, purified and separated, whereby the intended fatty acid diester compound (D) and fatty acid monoester compound (E) can be obtained.

The fatty acid diester compound (D) and fatty acid monoester compound (E) obtained can be identified by the following method. For example, the fatty acid diester compound and the fatty acid monoester compound are added to a methanol solution containing potassium hydroxide and heated to give rise to hydrolysis. Then, neutralization with hydrochloric acid is conducted, after which hexane is added to extract the formed fatty acids. The fatty acids are methyl-esterified and the alkyl moiety of each fatty acid is analyzed by gas chromatography (GC-FID). Next, the ester analysis of each fatty acid ester compound is conducted by dissolving the ester compound in a solvent or subjecting, in some cases, the ester compound to trimethylsilylation (TMS), and conducting gas chromatography (GC-FID).

In the present invention, known additives ordinarily used in polyacetal resins can be used as necessary as long as the object of the present invention is not impaired thereby. Such additives include, for example, an antioxidant, a polymer containing a formaldehyde-reactive nitrogen atom(s), a light stabilizer, a releasing agent, a pigment and a filler. The amounts of these additives vary depending upon the kinds of the additives used, but are each about 0.01 to 1 part by weight per 100 parts by weight of the polyacetal resin.

As the antioxidant, at least one kind of hindered phenol type antioxidant can be used. Specific examples thereof are n-octadecyl 3-(3',5'-di-tert-butyl-4'-hydroxyphenyl) propionate, n-octadecyl 3-(3'-methyl-5'-tert-butyl-4'-hydroxyphenyl)propionate, n-tetradecyl 3-(3',5'-di-tert-butyl-4'-hydroxyphenyl)propionate, 1,6-hexanediol bis-[3-(3,5-di-tert-butyl-4-hydroxyphenyl)propionate], 1,4-butanediol bis-[3-(3,5-di-tert-butyl-4-hydroxyphenyl) propionate], triethylene glycol bis-[3-(3-tert-butyl-5-methyl-4-hydroxyphenyl)propionate], tetrakis[methylene 3-(3',5'-di-tert-butyl-4'-hydroxyphenyl)propionate]methane, 3,9-bis[2-{3-(3-tert-butyl-4-hydroxy-5-methylphenyl) propionyloxy}-1,1-dimethylethyl]-2,4,8,10-tetraoxaspiro(5,5)undecane, N,N'-bis-3-(3',5'-di-tert-butyl-4'-hydroxyphenyl)propionyl-hexamethylenediamine, N,N'-tetramethylene-bis-3-(3'-methyl-5$^1$-tert-butyl-4'-hydroxyphenol)propionyldiamine, N,N'-bis-[3-(3,5-di-tert-butyl-4-hydroxyphenol)propionyl]-hydrazine, N-salicyloyl-N'-salicylidenehydrazine, 3-(N-salicyloyl)amino-1,2,4-triazole and N,N'-bis[2-{3-(3,5-di-tert-butyl-4-hydroxyphenyl)propionyloxy}ethyl]oxyamide. Preferred are triethylene glycol bis-[3-(3-tert-butyl-5-methyl-4-hydroxyphenyl)propionate] and tetrakis[methylene 3-(3',5'-di-tert-butyl-41-hydroxyphenyl)propionate]methane.

As examples of the polymer containing a formaldehyde-reactive nitrogen atom(s), there can be mentioned a polyamide resin (e.g. nylon 4-6, nylon 6, nylon 6-6, nylon 6-10, nylon 6-12 or nylon 12) and a copolymer thereof (e.g. nylon 6/6-6/6-10 or nylon 6/6-12). Besides, there can be mentioned acrylamide, a derivative hereof and a copolymer of acrylamide or a derivative hereof and other vinyl monomer. An example of the copolymer is a poly-β-alanine copolymer obtained by polymerizing acrylamide or a derivative thereof with other vinyl monomer in the presence of a metal alcoholate. There can further be mentioned an amino-substituted triazine compound, an adduct of an amino-substituted triazine compound and formaldehyde, and a polycondensate of an amino-substituted triazine compound and formaldehyde. These polymers containing a formaldehyde-reactive nitrogen atom(s) can be used singly or in combination of two or more kinds.

As specific examples of the amino-substituted triazine compound, there can be mentioned guanamine (2,4-diamino-sym-triazine), melamine (2,4,6-triamino-sym-triazine), N-butylmelamine, N-phenylmelamine, N,N'-diphenylmelamine, N,N'-diallylmelamine, N,N',N"-triphenylmelamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine and N,N',N"-tetracyanoethylbenzoguanamine.

As specific examples of the adduct of an amino-substituted triazine compound and formaldehyde, there can be mentioned N-methylolmelamine, N,N'-dimethylolmelamine and N,N',N"-trimethylolmelamine.

As specific examples of the condensate of an amino-substituted triazine compound and formaldehyde, there can be mentioned a melamine-triazine condensate.

These amino-substituted triazine compounds, adducts of an amino-substituted triazine compound and formaldehyde, and condensates of an amino-substituted triazine compound and formaldehyde can be used singly or in combination of two or more kinds.

As examples of the light stabilizers, there can be mentioned at least one kind selected from a benzotriazole type ultraviolet absorber, an oxalic acid anilide type ultraviolet absorber and a hindered amine type light stabilizer. As examples of the benzotriazole type ultraviolet absorber, there can be mentioned 2-(2'-hydroxy-5'-methylphenyl) benzotriazole, 2-(2'-hydroxy-3',5'-di-tert-butylphenyl) benzotriazole, 2-(2'-hydroxy-3',5'-diisoamylphenyl) benzotriazole, 2-[2'-hydroxy-3',5'-bis-(α,α-dimethylbenzyl) phenyl]-2H-benzotriazole and 2-(2'-hydroxy-4'-octoxyphenyl)benzotriazole. As examples of the oxalic acid anilide type ultraviolet absorber, there can be mentioned 2-ethoxy-2'-ethyloxalic acid bisanilide, 2-ethoxy-5-tert-butyl-2'-ethyloxalic acid bisanilide and 2-ethoxy-3'-dodecyloxalic acid bisanilide. These ultraviolet absorbers can be used singly or in combination of two or more kinds.

As examples of the hindered amine type light stabilizer, there can be mentioned 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl) carbonate, bis(2,2,6,6-tetramethyl-4-piperidyl) oxalate, bis (2,2,6,6-tetramethyl-4-piperidyl) malonate, bis (2,2,6,6-tetramethyl-4-piperidyl) sebacate, bis(2,2,6,6-tetramethyl-4-piperidyl) adipate, bis(2,2,6,6-tetramethyl-4-piperidyl) terephthalate, 1,2-bis(2,2,6,6-tetramethyl-4-piperidyloxy) ethane, α, α'-bis(2,2,6,6-tetramethyl-4-piperidyloxy)-p-xylene, bis(2,2,6,6-tetramethyl-4-piperidyl) tolylene-2,4-dicarbamate, bis(2,2,6,6-tetramethyl-4-piperidyl) hexamethylene-1,6-dicarbamate, tris(2,2,6,6-tetramethyl-4-piperidyl) benzene-1,3,5-tricarboxylate, tris(2,2,6,6-tetramethyl-4-piperidyl) benzene-1,3,4-tricarboxylate, 1-[2-{3-(3,5-di-tert-butyl-4-hydroxyphenyl) propionyloxy}butyl]-4-[3-(3,5-di-tert-butyl-4-hydroxyphenyl)propionyloxy]2,2,6,6-tetramethylpiperidine, and a condensate of 1,2,3,4-butanetetracarboxylic acid, 1,2,2,6,6-pentamethyl-4-piperidinol and β,β,β',β'-tetramethyl-3,9-[2,4,8,10-tetraoxaspiro(5,5)undecane]diethanol. These hindered amine type light stabilizers may be used singly or in combination of two or more kinds. The hindered amine type light stabilizer may be used in combination with the benzotriazole type ultraviolet absorber and/or the oxalic acid anilide type ultraviolet absorber.

As examples of the releasing agent, there can be mentioned at least one kind selected from a polyalkylene glycol, an amide group-containing aliphatic compound and a polyolefin.

As the polyalkylene glycol, those represented by the following general formula (III) can be used:

(III)

wherein each $R_6$ group may be the same or different and are each a hydrogen atom, an alkyl group containing 1 to 6 carbon atoms, a substituted alkyl group or a substituted allyl group; X is an integer of 2 to 6; and Y is an integer of 1,000 to 20,000.

The polyalkylene glycol can be obtained by subjecting an alkylene oxide to ring-opening polymerization. As specific examples of the alkylene oxide, there can be mentioned ethylene oxide, propylene oxide, butylene oxide, epichlorohydrin, styrene oxide, oxetane, 3,3-bis(chloromethyl)oxetane, tetrahydrofuran, 2-methyltetrahydrofuran and oxepane. These polyalkylene glycols can be used singly or in combination of two or more kinds.

The amide group-containing aliphatic compound is an aliphatic compound represented by the following general formula (IV):

(IV)

wherein $R_7$ and $R_9$ may be the same or different and are each an alkyl group containing 9 to 35 carbon atoms, and $R_8$ is an alkylene group containing 1 to 6 carbon atoms.

As specific examples of the amide group-containing aliphatic compound, there can be mentioned ethylenebispalmitamide, ethylenebissteramide, ethylenebislauramide, ethylenebisoleamide, ethylenebiserucamide, ethylene(monopalmitic acid-monostearic acid)amide and ethylene(monostearic acid-monoheptadecylic acid)amide. These amide group-containing aliphatic compounds can be used singly or in combination of two or more kinds.

The polyolefin is a polyolefin represented by the following general formula (V):

(V)

wherein each $R_{10}$ group may be the same or different and are each a hydrogen atom, an alkyl group containing 1 to 6 carbon atoms, or a substituted allyl group, and Z is an integer of 10 to 100,000.

As specific examples of the polyolefin, there can be mentioned a polyethylene, a polypropylene, a polybutylene and an ethylene-propylene copolymer.

As the pigment, there can be mentioned an inorganic pigment, an organic pigment, a metallic pigment, a fluorescent pigment, etc. Specific examples of the inorganic pigment are rutile or anatase type titanium oxide, iron oxide, ultramarine, carbon black and Titan Yellow; and the organic pigment includes azo type pigments, phthalocyanine type pigments, anthraquinone type pigments, perinone type pigments, perylene type pigments, quinacridone type pigments, isoindoline type pigments, thioindigo type pigments, dioxazine type pigments, isoviolanthrone type pigments, indanthrone type pigments, etc.

As the filler, there can be mentioned reinforcing agents such as glass fiber, glass beads, glass balloon, wollastonite, carbon fiber, talc, mica, titanium whiskers and the like; and nucleating agents represented by boron nitride, etc.

The essential component of the present invention and other additives are added in a powdery state or a molten state. Advance mixing of the essential components and the additives with each other or advance mixing of the essential components and the additives with the polyacetal resin, prior to melting and kneading, is preferred to achieve the effects of the present invention. This advance mixing can be conducted by an appropriate known method, which is not particularly restricted.

The polyacetal resin composition of the present invention has no particular restriction as to the production process. It can be produced generally by melting and kneading the polyacetal resin, the essential components specified in the present invention, and optional additives using an extruder. The extruder may be a single screw type or a twin screw type. The additives may be added during production of the polyacetal resin. The temperature of the extruder is appropriately selected ordinarily in a range of 170 to 240° C. and is not particularly restricted.

There is no particular restriction as to the method for molding the present resin composition. The resin composition can be molded by any of known molding methods such as extrusion molding, injection molding, compression molding, vacuum molding, blow molding, foam molding, insert molding, out-sert molding and the like.

The polyacetal resin composition of the present invention comprises a polyacetal resin, a particular difatty acid alkaline earth metal salt and a particular fatty acid, and gives a molded material improved in ESCR and physical properties of weld portion. The composition, when further comprising particular fatty acid esters, gives a molded material improved in heat aging resistance of weld portion. Therefore, the present polyacetal resin composition can find wide applications as automobile parts, parts of electric or electronic appliances, industrial parts (e.g. sash roller) and other mechanical parts. The composition is particularly suitable for use in stress-receiving mechanical parts (e.g. gear) or automobile parts exposed to high temperatures.

The present invention is described in more detail below by reference to Production Examples, test methods, Examples and Comparative Examples.

(1) Production of polyacetal resin (A)

1: Production of polyacetal resin (a1)

A 5-liter kneader provided with two agitating blades and equipped with a jacket capable of passing a heat medium therethrough was adjusted to 80° C. Therein were placed 3 kg of trioxane containing 15 ppm of water, 4.0 mol %, per mole of trioxane (1.33 moles) of 1,3-dioxolane containing 100 ppm of tetrakis[methylene 3-(3',5'-di-tert-butyl-4-hydroxyphenyl)propionate]methane, and $0.7 \times 10^{-3}$ mole of methylal as a molecular weight modifier, followed by mixing. To the resulting mixture was added $0.15 \times 10^{-4}$ mole, per mole of trioxane, of boron trifluoride dibutyl ether as a polymerization catalyst, and polymerization was conducted. Thirty (30) minutes from the start of the polymerization, a heat medium of 30° C. was passed through the jacket; 2 liters of an aqueous solution containing 1% of triethylamine was added; catalyst deactivation was allowed to take place for 1 hour; and the reaction was stopped. Thereafter, the contents of the kneader were taken out and filtered. The filter cake was dried at 100° C. to obtain 2.7 kg of a polyacetal resin. The polyacetal resin was fed into a twin-screw extruder (L/D ratio: 32) having one 30-mm vent hole and subjected to terminal stabilization and degassing under such conditions that the extruder temperature was 200° C., the amounts of water and triethylamine (used as a basic substance) injected into the reaction zone of the extruder were 0.2% by weight and 0.1% by weight, respectively, based on the polyacetal resin, and the vacuum of the vent was 200 mmHg, whereby a terminal-stabilized polyacetal resin (a1) was obtained in the form of pellets. The polyacetal resin (a1) generated 1,100 ppm of formaldehyde gas as measured by a test method described later and had a melt index of 10 g/10 min.

2. Production of polyacetal resin (a2)

A terminal-stabilized polyacetal resin (a2) was obtained in substantially the same manner as in the production of the polyacetal resin (a1) except that the vacuum of the extruder vent at the time of terminal stabilization of polyacetal resin was changed to 700 mmHg. The polyacetal resin (a2) generated 260 ppm of formaldehyde gas and had a melt index of 10 g/10 min.

(2) Production of difatty acid alkaline earth metal salt (B)

1. Production of difatty acid alkaline earth metal salt (b1)

One hundred (100) grams of stearic acid and 100 g of palmitic acid were added to 0.6 liter of water; the resulting mixture was heated to 80° C. with stirring, to homogeneously dissolve the two kinds of fatty acids in water; thereto was added 4 g of a calcium-substituted A type zeolite, followed by stirring for 30 minutes; 0.7 liter of water was added and the system temperature was adjusted to 50° C. Separately, 39 g of calcium hydroxide was dispersed in 0.7 liter of water with stirring; the resulting calcium hydroxide dispersion was gradually added to the above-prepared fatty acid solution; the resulting mixture was adjusted to 65° C. and then stirred for 30 minutes; the resulting precipitate (difatty acid alkaline earth metal salt) was collected by filtration, washed 50 times with 0.4 liter of hot water of 80° C. (the total amount of water used=20 liters), and dried to obtain a difatty acid alkaline earth metal salt (b1) which had no fatty acid detected according to the following detection method.

The analysis of fatty acids in the obtained difatty acid alkaline earth metal salt was conducted as follows: Fifty (50) grams of the dried difatty acid alkaline earth metal salt was mixed with 500 g of water. The resulting mixture was heated at 80° C. for 30 minutes and then filtered to separate the difatty acid alkaline earth metal salt from water. The filtrate was concentrated to 1 g by the use of an evaporator (400 mmHg and 80° C.). The concentrate was examined for the presence of fatty acids by means of a gas chromatography mass spectrometer (GC-MS: HP5890+HP5971A, a product of Hewlett-Packard Co.). Neither stearic acid nor palmitic acid was detected. Incidentally, the detection limit of fatty acids in the GC-MS used in the present test is 1 ppm in 1 µl of an injection amount (fixed condition). From this, it is interpreted that the total content of stearic acid and palmitic acid in the above-obtained difatty acid alkaline earth metal salt is 40 ppt or less.

2. Production of difatty acid alkaline earth metal salt (b2)

In the same manner as in the production of the difatty acid alkaline earth metal salt (b1) except that 200 g of palmitic acid was used, a difatty acid alkaline earth metal salt (b2) was produced which had no fatty acid detected according to the above detection method.

3. Production of difatty acid alkaline earth metal salt (b3)

In the same manner as in the production of the difatty acid alkaline earth metal salt (b1) except that 200 g of stearic acid was used, a difatty acid alkaline earth metal salt (b3) was produced which had no fatty acid detected according to the above detection method.

4. Production of difatty acid alkaline earth metal salt (b4)

In the same manner as in the production of the difatty acid alkaline earth metal salt (b1) except that 99.9 g of palmitic acid, 0.2 g of heptadecylic acid and 99.9 g of stearic acid were used, a difatty acid alkaline earth metal salt (b4) was produced which had no fatty acid detected according to the above detection method.

The difatty acid alkaline earth metal salt (b4) was measured for the content of unreacted metal compound by adding 10 g of the difatty acid alkaline earth metal salt (b4) to 100 ml of water, subjecting the resulting mixture to an ultrasonic treatment for 10 minutes by means of an ultrasonic cleaner (W-211, a product of Masuda Rika Co.), quantitatively determining the amount of metal calcium present in the filtrate by means of a conductivity detector (431, a product of Waters Co.), and converting the calcium amount to the amount of calcium hydroxide used as raw material. The content of unreacted metal compound was 220 ppm.

5. Production of difatty acid alkaline earth metal salt (b5)

In the same manner as in the production of the difatty acid alkaline earth metal salt (b1) except that 99 g of palmitic acid, 2 g of heptadecylic acid and 99 g of stearic acid were used, a difatty acid alkaline earth metal salt (b5) was produced which had no fatty acid detected according to the above detection method.

6. Production of difatty acid alkaline earth metal salt (b6)

In the same manner as in the production of the difatty acid alkaline earth metal salt (b1) except that 5 g of palmitic acid, 10 g of heptadecylic acid and 5 g of stearic acid were used and that the amounts of water and calcium hydroxide used were each reduced to $\frac{1}{10}$, a difatty acid alkaline earth metal salt (b6) was produced which had no fatty acid detected according to the following detection method.

Five (5) grams of the difatty acid alkaline earth metal salt (b6) was mixed with 50 g of water. The resulting mixture was heated at 80° C. for 30 minutes and filtered to separate the difatty acid alkaline earth metal salt from water. The filtrate was concentrated to 0.1 g by means of an evaporator. The concentrate was examined for the presence of fatty acids by means of a gas chromatography mass spectrometer in the same manner as mentioned above.

7. Production of difatty acid alkaline earth metal salt (b7)

In the same manner as in the production of the difatty acid alkaline earth metal salt (b1) except that 100 g of lauric acid and 100 g of myristic were used, a difatty acid alkaline earth metal salt (b7) was produced which had no fatty acid detected according to the above detection method.

8. Production of difatty acid alkaline earth metal salt (b8)

In the same manner as in the production of the difatty acid alkaline earth metal salt (b1) except that 100 g of arachic acid and 100 g of behenic acid were used, a difatty acid alkaline earth metal salt (b8) was produced which had no fatty acid detected according to the above detection method.

9. Production of difatty acid alkaline earth metal salt (b9)

In the same manner as in the production of the difatty acid alkaline earth metal salt (b1) except that the metal compound was changed from calcium hydroxide to magnesium hydroxide, a difatty acid alkaline earth metal salt (b9) was produced which had no fatty acid detected according to the above detection method.

10. Production of difatty acid alkaline earth metal salt (b10)

An aqueous calcium hydroxide solution was sprayed onto the difatty acid alkaline earth metal salt (b4), followed by drying, to obtain a difatty acid alkaline earth metal salt (b10) which had a converted amount of calcium hydroxide of 780 ppm according to the above test method for unreacted metal compound.

Other compounds and additives used in Examples and Comparative Examples were as follows:

(3) Fatty acid (C)
    c1: Lauric acid
    c2: Myristic acid
    c3: Palmitic acid
    c4: Heptadecylic acid
    c5: Stearic acid
    c6: Arachic acid
    c7: Behenic acid (4) Fatty acid diester compound (D)
    d1: Ethylene glycol dipalmitate (the moles of ethylene glycol added: 1)
    d2: Ethylene glycol distearate (the moles of ethylene glycol added: 1)
    d3: Ethylene glycol myristate palmitate (the moles of ethylene glycol added: 1)
    d4: Ethylene glycol palmitate stearate (the moles of ethylene glycol added: 1)
    d5: Ethylene glycol distearate (the moles of ethylene glycol added: 7)
    d6: Ethylene glycol distearate (the moles of ethylene glycol added: 70)

(5) Fatty acid monoester compound (E)
    e1: Ethylene glycol monopalmitate (the moles of ethylene glycol added: 1)
    e2: Ethylene glycol monostearate (the moles of ethylene glycol added: 1)
    e3: Ethylene glycol monostearate (the moles of ethylene glycol added: 7)
    e4: Ethylene glycol monostearate (the moles of ethylene glycol added: 70)

(6) Hindered phenol type antioxidant
    f1: Triethylene glycol bis-[3-(3-tert-butyl-5-methyl-4-hydroxyphenyl)propionate]

(7) Polymer or compound containing a formaldehyde-reactive nitrogen atom(s)
    g1: Nylon 6-6
    g2: Melamine (8) Test method for ESCR A molded specimen (length 127 mm, width=13 mm, thickness=3 mm) was produced using an injection molding machine (Netstal Molding Machine, a product of Sumitomo Heavy Industries, Ltd.) having an injection capacity of 5 ounces, under the conditions of cylinder temperature=200° C., die temperature=80° C., injection time=20 seconds and cooling time=10 seconds. The molded specimen was bent and fitted to a jig of 111 mm in length, after which it was immersed in a 2 N aqueous hydrochloric acid of 23° C. and measured for the time from the immersion start to the cracking and rupture. The number of specimens tested was 100 in each of Examples 1 to 26 and Comparative Examples 1 to 9, and 30 in each of Examples 30 to 55 and Comparative Examples 13 to 20. For each specimen of the Examples and the Comparative Examples, there were determined average time (seconds) and the number of samples (specimens) which cracked in a time shorter than 80% of average time (this number was expressed as "average time—20%" in Tables).

(9) Evaluation of physical properties of weld portion

1. Molding of Dumbbell specimen having a weld portion

A dumbbell specimen having a weld line at the center was produced using an injection molding machine (Netstal Molding Machine, a product of Sumitomo Heavy Industries, Ltd.) having an injection capacity of 5 ounces, under the conditions of cylinder temperature=200° C., die temperature=70° C., injection time=15 seconds, cooling time=25 seconds, specimen size=13 mm×180 mm×3 mm and gates=two points (tab gates).

2. Molding of Dumbbell specimen having no weld portion

A dumbbell specimen having no weld portion was produced under the same molding conditions as mentioned above except that the gates were changed to gate=one point (tab gate).

3. Test method for heat aging resistance

The above-produced specimens were suspended in a gear oven set at 150° C. and heated for 240 hours. Then, the specimens were taken out from the gear oven and allowed to stand for 2 days in a thermoset kept at a temperature of 23° C. at a humidity of 50%. Thereafter, the specimens were measured for tensile strength and elongation (distance between chucks=114 mm) under the conditions shown below. Also, the specimens before the heat aging resistance test were measured for the same items, after having being allowed to stand for 2 days in a thermoset kept at a temperature of 23° C. at a humidity of 50%.

Tensile tester: Autograph AG-1000B, a product of Shimadzu Corporation

Pulling speed: 5 mm/min (10) Appearance of molded material

The same molded specimen as produced for the above-mentioned ESCR testing was visually observed for appearance of silver (mark similar to scratch, formed by decomposition, etc. of polyacetal resin) or occurrence of color change.

(11) Amount of formaldehyde gas generated

Three (3) grams of a polyacetal resin was placed in an Al-made container and melted at 230° C. for 50 minutes in a nitrogen current (6 liters/hr). The formaldehyde generated during the melting was allowed to be absorbed by a 1 mole/l aqueous sodium sulfite solution. The resulting solution was titrated with 0.01 N sulfuric acid, whereby the amount of formaldehyde generated was determined and expressed as ppm relative to the weight of the polyacetal resin.

EXAMPLES 1 TO 24 AND 26 AND COMPARATIVE EXAMPLES 1 TO 9

Each of the compositions shown in Table 1, Table 2 and Table 3 was melted and kneaded using a twin-screw extruder (L/D=32) having a vent of 30 mm in inner diameter, under the conditions of cylinder temperature=200° C., rotational frequency (screw)=100 rpm, discharge rate=5 kg/hr and vacuum of vent=700 mmHg to obtain pellets.

Using the pellets, the ESCR, physical properties of weld portion and appearance of molded material were examined according to the above-mentioned test methods. The results are shown in Table 5 and Table 6. The expression "impossible to measure" used in the column of weld portion-after aging, of Table 6 indicates that when the heat aging resistance test was completed, there had already been rupture of weld portion, or tensile strength was less than 50 kg/cm$^2$ or elongation was less than 1% and rupture occurred.

In the case of compositions using a difatty acid alkaline earth metal salt(s) and a fatty acid(s), the metal salt(s) and fatty acid(s) were mixed in advance by dissolving the fatty acid(s) in water of 80° C. and mixing the solution with the metal salt(s). The resulting mixture was dried and then ground in an agate mortar for 5 minutes. In the compositions using only a difatty acid alkaline earth metal salt(s) or only a fatty acid, the metal salt(s) or the fatty acid was ground in an agate mortar for 5 minutes.

As a result, the results of Example 9 using a difatty acid alkaline earth metal salt produced from two kinds of fatty acids, were superior to the results of Comparative Example 6 using, in the same amount, a difatty acid alkaline earth metal salt produced from one kind of fatty acid and the results of Comparative Examples 8 and 9 each using two kinds of difatty acid alkaline earth metal salts each produced from one kind of fatty acid.

Also, improvement in ESCR was significant and improvement in variation of ESCR was surprising in Examples 21 and 23 wherein the difatty acid alkaline earth metal salt (B) was produced using a fatty acid having an odd-number carbon atoms and two kinds of fatty acids each having even-number carbon atoms, and the fatty acid (C) was the same as those used in the production of the component (B), i.e. a fatty acid having odd-number carbon atoms and two kinds of fatty acids each having even-number carbon atoms.

EXAMPLE 25

In the pelletization conducted in Example 1, etc., a difatty acid alkaline earth metal salt (B) and a fatty acid (C) (consisting of three kinds) were ground independently without being premixed with each other, and the resulting respective powders were dry-blended with a polyacetal resin to obtain pellets. Using the pellets, the ESCR, physical properties of weld portion and appearance of molded material were examined according to the above-mentioned test methods. The results are shown in Table 5.

EXAMPLES 27 TO 29 AND COMPARATIVE EXAMPLES 10 TO 12

Figure 1:
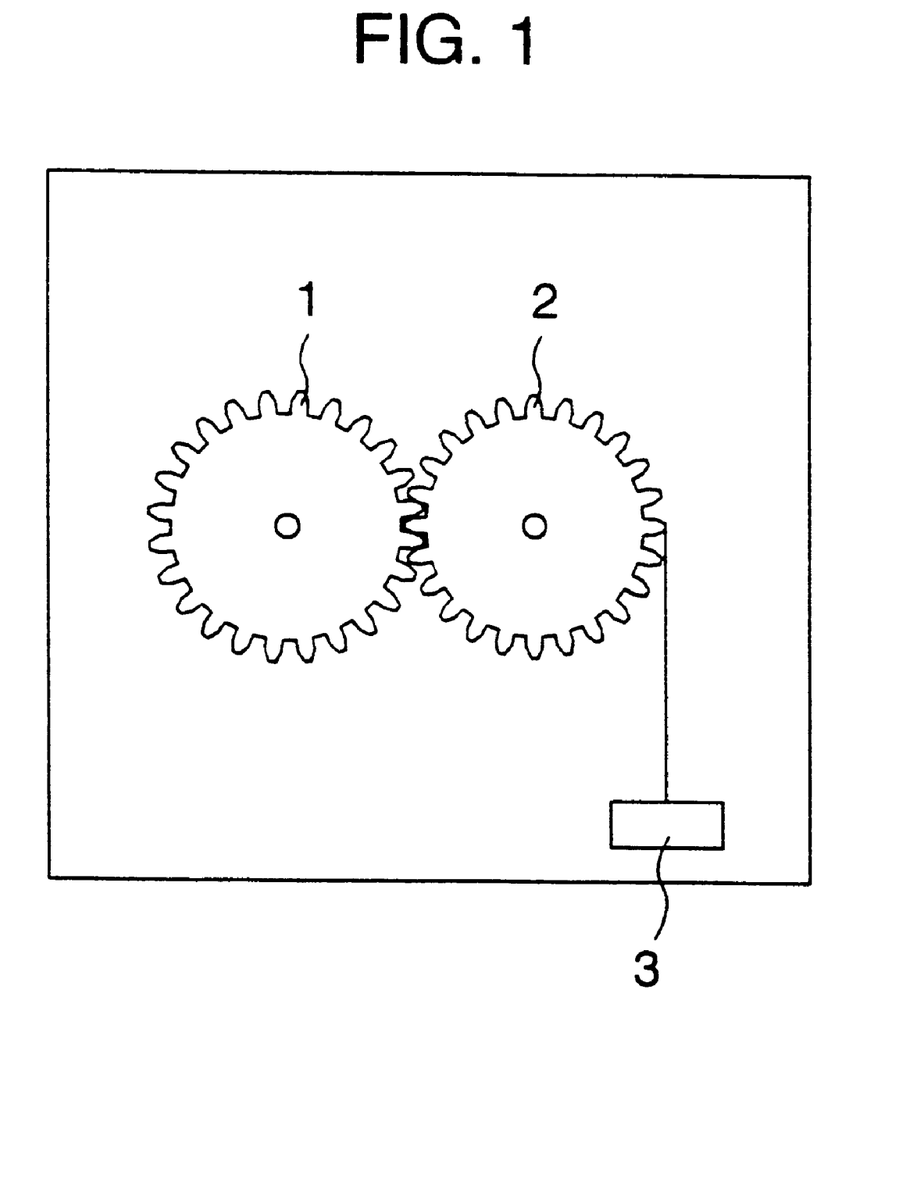
FIG. 1 is a drawing explaining the test method for ESCR used in Examples 27 to 29 and Comparative Examples 10 to 12.

Using an injection molding machine (PLASTAR Molding Machine, a product of Toyo Kikai Kinzoku Co.) having an injection capacity of 1 ounce, and setting the cylinder temperature at 200° C. and the die temperature at 80° C., there were produced two same gears 1 and 2 of three web gates (gate size=1.7 mm in diameter) on the circumference (17 mm in diameter), module=1, number of gear teeth=30, pressure angle=20°, thickness=5 mm, diameter of pitch circle=30 mm, diameter of addendum circle=32 mm and inner diameter of hub=6 mm. The gear 1 was fixed to a jig shown in FIG. 1 so as to make no rotation; and the gear 2 was fitted to the jig at its position where the gear 1 and the gear 2 could mesh with each other at their addenda, so that the gear 2 could rotate about its axis. A weight 3 (100 g) was applied to the outer circumference of the gear 2. In that state, the gears were immersed in a 2 N aqueous hydrochloric acid of 23° C.; and the time was measured from the start of the immersion to the cracking and rupture of the addendum portion of engaging teeth. Incidentally, the gears 1 and 2 were made from the same resin composition; the above measurement of time was conducted 10 times; the results were expressed as average time (seconds) and the number of measurements (samples) where cracking appeared in a time shorter than 80% of average time (this number was expressed as "average time—20%" in Table 7). There was also the appearance of streaks or color change in the gears. The composition used in each Example or each Comparative Example and the results obtained are shown in Table 4 and Table 7. To evaluate the physical properties of weld portion, a stainless steel (SUS-316) shaft having an outer diameter of 6.24 mm or 6.36 mm was forced in the hub of the above-produced gear; the number of samples (gears) was 5; the number of cracked samples is shown in Table 7.

In the compositions using a difatty acid alkaline earth metal salt(s) and a fatty acid(s), as in the compositions of Example 1, etc., the metal salt(s) and fatty acid(s) were mixed in advance by dissolving the fatty acid(s) in water of 80° C. and mixing the solution with the metal salt(s). The resulting mixture was dried and then ground in an agate mortar for 5 minutes. In the compositions using only a difatty acid alkaline earth metal salt or only fatty acids, the metal salt or the fatty acids were ground in an agate mortar for 5 minutes.

EXAMPLES 30 TO 55 AND COMPARATIVE EXAMPLES 13 TO 20

A polyacetal resin (A), a difatty acid alkaline earth metal salt (B), a fatty acid (C), a fatty acid diester (D), a fatty acid monoester (E) and optionally additives were placed in a Henschel mixer, uniformly mixed at 860 rpm for 2 minutes, and taken out. The resulting mixture was melted and kneaded at 200° C. using a twin-screw extruder having an inner diameter of 30 mm, to obtain pellets.

Using the pellets, the ESCR, physical properties of weld portion and appearance of molded material were examined according to the above-mentioned test methods. The composition of each Example or Comparative Example is shown in Table 8, Table 9 and Table 10, and the results are shown in Table 11 and Table 12. The expression "impossible to measure" used in the column of weld portion-after aging, of Table 12 indicates that when the heat aging resistance test was completed, there had already been rupture of weld portion, or tensile strength was less than 50 kg/cm$^2$ or elongation was less than 1% and rupture occurred.

Comparison of Example 3 and Example 33, Example 4 and Example 30, and Example 5 and Example 34 indicate the effect of use of fatty acid diester (D) and fatty acid monoester (E). In the compositions containing a fatty acid diester and a fatty acid monoester, as compared with the compositions containing neither component (D) nor component (E), the retention of properties of the weld portion after a heat aging resistance test was improved.

TABLE 1

|  | Polyacetal resin (parts by weight) | Difatty acid alkaline earth metal salt (parts by weight) | Fatty acid (parts by weight) | Fatty acid diester (parts by weight) | Fatty acid monoester (parts by weight) | Others (parts by weight) |
|---|---|---|---|---|---|---|
| Example 1 | a2 100 | b1 0.001 | c3 $1.0 \times 10^{-4}$ |  |  |  |
| Example 2 | a2 100 | b1 0.001 | c3 $1.0 \times 10^{-2}$ |  |  |  |

TABLE 1-continued

| | Polyacetal resin (parts by weight) | Difatty acid alkaline earth metal salt (parts by weight) | Fatty acid (parts by weight) | Fatty acid diester (parts by weight) | Fatty acid monoester (parts by weight) | Others (parts by weight) |
|---|---|---|---|---|---|---|
| Example 3 | a2 100 | b1 0.01 | c3 $1.0 \times 10^{-3}$ | | | |
| Example 4 | a2 100 | b1 0.1 | c3 $1.0 \times 10^{-3}$ | | | |
| Example 5 | a2 100 | b1 0.5 | c3 $1.0 \times 10^{-3}$ | | | |
| Example 6 | a2 100 | b1 1.0 | c3 $1.0 \times 10^{-6}$ | | | |
| Example 7 | a2 100 | b1 1.0 | c3 $1.0 \times 10^{-4}$ | | | |
| Example 8 | a2 100 | b1 1.0 | c3 $1.0 \times 10^{-1}$ | | | |
| Example 9 | a2 100 | b1 0.2 | c3 $2.0 \times 10^{-4}$ | | | |
| Example 10 | a2 100 | b4 0.2 | c3 $2.0 \times 10^{-4}$ | | | |
| Example 11 | a2 100 | b5 0.2 | c3 $2.0 \times 10^{-4}$ | | | |
| Example 12 | a2 100 | b6 0.2 | c3 $2.0 \times 10^{-4}$ | | | |
| Example 13 | a2 100 | b7 0.2 | c3 $2.0 \times 10^{-4}$ | | | |
| Example 14 | a2 100 | b8 0.2 | c3 $2.0 \times 10^{-4}$ | | | |

TABLE 2

| | Polyacetal resin (parts by weight) | Difatty acid alkaline earth metal salt (parts by weight) | Fatty acid (parts by weight) | Fatty acid diester (parts by weight) | Fatty acid monoester (parts by weight) | Others (parts by weight) |
|---|---|---|---|---|---|---|
| Example 15 | a2 100 | b9 0.2 | c3 $2.0 \times 10^{-4}$ | | | |
| Example 16 | a2 100 | b1 0.2 | c1 $2.0 \times 10^{-4}$ | | | |
| Example 17 | a2 100 | b1 0.2 | c7 $2.0 \times 10^{-4}$ | | | |
| Example 18 | a2 100 | b1 0.2 | c3 = $1.0 \times 10^{-4}$ c5 = $1.0 \times 10^{-4}$ | | | |
| Example 19 | a2 100 | b1 0.2 | c1 = $1.0 \times 10^{-4}$ c2 = $1.0 \times 10^{-4}$ | | | |
| Example 20 | a2 100 | b1 0.2 | c6 = $1.0 \times 10^{-4}$ c7 = $1.0 \times 10^{-4}$ | | | |
| Example 21 | a2 100 | b5 0.2 | c3 = $1.0 \times 10^{-4}$ c5 = $1.0 \times 10^{-4}$ | | | |
| Example 22 | a2 100 | b5 0.2 | c3 = $1.0 \times 10^{-4}$ c4 = $0.22 \times 10^{-6}$ c5 = $1.0 \times 10^{-4}$ | | | |
| Example 23 | a2 100 | b5 0.2 | c3 = $1.0 \times 10^{-4}$ c4 = $0.23 \times 10^{-5}$ c5 = $1.0 \times 10^{-4}$ | | | |
| Example 24 | a2 100 | b5 0.2 | c3 = $0.67 \times 10^{-4}$ c4 = $0.67 \times 10^{-4}$ c5 = $0.67 \times 10^{-4}$ | | | |
| Example 25 | a2 100 | b5 0.2 | c3 = $0.67 \times 10^{-4}$ c4 = $0.67 \times 10^{-4}$ c5 = $0.67 \times 10^{-4}$ | | | |
| Example 26 | a1 100 | b5 0.2 | c3 = $0.67 \times 10^{-4}$ c4 = $0.67 \times 10^{-4}$ c5 = $0.67 \times 10^{-4}$ | | | |

TABLE 3

|  | Polyacetal resin (parts by weight) | Difatty acid alkaline earth metal salt (parts by weight) | Fatty acid (parts by weight) | Fatty acid diester (parts by weight) | Fatty acid monoester (parts by weight) | Others (parts by weight) |
|---|---|---|---|---|---|---|
| Comparative Example 1 | a2 100 | 0 | 0 | | | |
| Comparative Example 2 | a2 100 | b1 1.0 | 0 | | | |
| Comparative Example 3 | a2 100 | b1 1.0 | c3 1.0 | | | |
| Comparative Example 4 | a2 100 | 0 | c3 $1.0 \times 10^{-4}$ | | | |
| Comparative Example 5 | a2 100 | b1 2.0 | c3 $1.0 \times 10^{-4}$ | | | |
| Comparative Example 6 | a2 100 | b2 0.2 | c3 $2.0 \times 10^{-4}$ | | | |
| Comparative Example 7 | a2 100 | b2/b3 0.005/0.005 | c3 $1.0 \times 10^{-4}$ | | | |
| Comparative Example 8 | a2 100 | b2/b3 0.1/0.1 | c3 = $1.0 \times 10^{-4}$<br>c5 = $1.0 \times 10^{-4}$ | | | |
| Comparative Example 9 | a2 100 | b2/b3 0.1/0.1 | 0 | | | |

TABLE 4

|  | Polyacetal resin (parts by weight) | Difatty acid alkaline earth metal salt (parts by weight) | Fatty acid (parts by weight) | Fatty acid diester (parts by weight) | Fatty acid monoester (parts by weight) | Others (parts by weight) |
|---|---|---|---|---|---|---|
| Example 27 | a2 100 | b5 0.05 | c5 = $1.0 \times 10^{-4}$ | | | |
| Example 28 | a2 100 | b5 0.05 | c3 = $0.5 \times 10^{-4}$<br>c5 = $0.5 \times 10^{-4}$ | | | |
| Example 29 | a2 100 | b5 0.05 | c3 = $0.5 \times 10^{-4}$<br>c4 = $0.12 \times 10^{-5}$<br>c5 = $0.5 \times 10^{-4}$ | | | |
| Comparative Example 10 | a2 100 | | c3 = $0.5 \times 10^{-4}$<br>c5 = $0.5 \times 10^{-4}$ | | | |
| Comparative Example 11 | a2 100 | b5 0.05 | | | | |
| Comparative Example 12 | a2 100 | b2/b3 0.025/0.025 | c3 = $0.5 \times 10^{-4}$<br>c5 = $0.5 \times 10^{-4}$ | | | |

TABLE 5

|  | ESCR | | Non-weld portion | | | | Weld portion | | | | Appearance of molded material |
|---|---|---|---|---|---|---|---|---|---|---|---|
|  | | | Two days after molding | | After aging | | Two days after molding | | After aging | | |
|  | Average time (sec) | Average time −20% | Tensile strength (kg/cm²) | Elongation (%) | Tensile strength (kg/cm²) | Elongation (%) | Tensile strength (kg/cm²) | Elongation (%) | Tensile strength (kg/cm²) | Elongation (%) | |
| Example 1 | 6300 | 4/100 | 589 | 30 | 588 | 30 | 570 | 24 | 495 | 14 | No defect |
| Example 2 | 6000 | 5/100 | 588 | 31 | 588 | 31 | 570 | 24 | 495 | 14 | No defect |
| Example 3 | 7000 | 3/100 | 588 | 29 | 587 | 32 | 571 | 26 | 496 | 15 | No defect |
| Example 4 | 7200 | 3/100 | 592 | 31 | 592 | 32 | 571 | 25 | 498 | 16 | No defect |
| Example 5 | 7500 | 3/100 | 590 | 32 | 590 | 31 | 571 | 25 | 497 | 15 | No defect |
| Example 6 | 6400 | 4/100 | 591 | 30 | 590 | 31 | 572 | 25 | 498 | 15 | No defect |
| Example 7 | 6500 | 4/100 | 590 | 30 | 591 | 30 | 572 | 26 | 497 | 16 | No defect |
| Example 8 | 6400 | 3/100 | 592 | 32 | 592 | 32 | 571 | 25 | 498 | 15 | No defect |
| Example 9 | 7800 | 3/100 | 591 | 30 | 591 | 30 | 572 | 24 | 497 | 16 | No defect |
| Example 10 | 8000 | 3/100 | 591 | 31 | 592 | 30 | 571 | 25 | 496 | 16 | No defect |
| Example 11 | 8100 | 3/100 | 590 | 32 | 591 | 31 | 571 | 24 | 495 | 15 | No defect |
| Example 12 | 8400 | 3/100 | 592 | 32 | 590 | 32 | 571 | 26 | 496 | 15 | No defect |

TABLE 5-continued

|  | ESCR | | Non-weld portion | | | | Weld portion | | | | |
|---|---|---|---|---|---|---|---|---|---|---|---|
|  | | | Two days after molding | | After eging | | Two days after molding | | After aging | | |
|  | Average time (sec) | Average time −20% | Tensile strength (kg/cm²) | Elongation (%) | Tensile strength (kg/cm²) | Elongation (%) | Tensile strength (kg/cm²) | Elongation (%) | Tensile strength (kg/cm²) | Elongation (%) | Appearance of molded material |
| Example 13 | 7200 | 4/100 | 591 | 31 | 591 | 30 | 570 | 23 | 496 | 15 | No defect |
| Example 14 | 7100 | 4/100 | 591 | 30 | 592 | 30 | 570 | 23 | 497 | 16 | No defect |
| Example 15 | 7300 | 4/100 | 590 | 30 | 592 | 31 | 571 | 22 | 498 | 15 | No defect |
| Example 16 | 7500 | 4/100 | 590 | 32 | 591 | 31 | 571 | 23 | 498 | 15 | No defect |
| Example 17 | 7300 | 3/100 | 590 | 31 | 591 | 30 | 571 | 22 | 498 | 16 | No defect |
| Example 18 | 8100 | 2/100 | 590 | 30 | 591 | 33 | 571 | 29 | 499 | 18 | No defect |
| Example 19 | 8000 | 2/100 | 591 | 32 | 591 | 32 | 571 | 27 | 498 | 18 | No defect |
| Example 20 | 7900 | 2/100 | 591 | 32 | 592 | 32 | 570 | 27 | 499 | 17 | No defect |
| Example 21 | 8200 | 2/100 | 591 | 32 | 590 | 30 | 572 | 27 | 499 | 17 | No defect |
| Example 22 | 8300 | 0/100 | 592 | 33 | 591 | 32 | 570 | 29 | 499 | 17 | No defect |
| Example 23 | 8500 | 0/100 | 590 | 33 | 590 | 31 | 571 | 29 | 498 | 18 | No defect |
| Example 24 | 8600 | 0/100 | 591 | 32 | 593 | 31 | 572 | 29 | 500 | 17 | No defect |
| Example 25 | 8200 | 2/100 | 591 | 31 | 591 | 32 | 572 | 27 | 499 | 17 | No defect |
| Example 26 | 8000 | 2/100 | 592 | 30 | 591 | 30 | 571 | 27 | 498 | 17 | No defect |

TABLE 6

|  | ESCR | | Non-weld portion | | | | Weld portion | | | | |
|---|---|---|---|---|---|---|---|---|---|---|---|
|  | | | Two days after molding | | After eging | | Two days after molding | | After aging | | |
|  | Average time (sec) | Average time −20% | Tensile strength (kg/cm²) | Elongation (%) | Tensile strength (kg/cm²) | Elongation (%) | Tensile strength (kg/cm²) | Elongation (%) | Tensile strength (kg/cm²) | Elongation (%) | Appearance of molded material |
| Comparative Example 1 | 2500 | 5/100 | 590 | 30 | 570 | 21 | 555 | 17 | Impossible to measure | | No defect |
| Comparative Example 2 | 4000 | 9/100 | 591 | 30 | 590 | 30 | 550 | 16 | 485 | 6 | No defect |
| Comparative Example 3 | 4600 | 11/100 | 591 | 31 | 591 | 31 | 558 | 19 | 486 | 7 | Appearance of silver |
| Comparative Example 4 | 3000 | 7/100 | 591 | 32 | 573 | 24 | 557 | 19 | Impossible to measure | | No defect |
| Comparative Example 5 | 5000 | 14/100 | 590 | 30 | 589 | 32 | 556 | 17 | 485 | 6 | Changed to light brown |
| Comparative Example 6 | 4400 | 8/100 | 589 | 30 | 588 | 30 | 558 | 17 | 490 | 8 | No defect |
| Comparative Example 7 | 5100 | 6/100 | 591 | 29 | 590 | 31 | 560 | 19 | 493 | 8 | No defect |
| Comparative Example 8 | 5200 | 5/100 | 590 | 30 | 590 | 30 | 561 | 20 | 494 | 9 | No defect |
| Comparative Example 9 | 4200 | 8/100 | 590 | 31 | 589 | 30 | 559 | 18 | 491 | 8 | No defect |

TABLE 7

|  | ESCR | | Number of cracked samples in forcing-in test | | Appearance of molded article |
|---|---|---|---|---|---|
|  | Average time (sec) | Average time −20% | 6.24 mm | 6.36 mm | |
| Example 27 | 4100 | 2/10 | 0/5 | 0/5 | No defect |
| Example 28 | 4300 | 1/10 | 0/5 | 0/5 | No defect |
| Example 29 | 4700 | 0/10 | 0/5 | 0/5 | No defect |
| Comparative Example 10 | 1800 | 2/10 | 1/5 | 3/5 | No defect |

TABLE 7-continued

|  | ESCR | | Number of cracked samples in forcing-in test | | Appearance of molded article |
|---|---|---|---|---|---|
|  | Average time (sec) | Average time −20% | 6.24 mm | 6.36 mm |  |
| Comparative Example 11 | 2100 | 3/10 | 2/5 | 4/5 | No defect |
| Comparative Example 12 | 2500 | 2/10 | 0/5 | 2/5 | No defect |

TABLE 8

|  | Polyacetal resin (parts by weight) | Difatty acid alkaline earth metal salt (parts by weight) | Fatty acid (parts by weight) | Fatty acid diester (parts by weight) | Fatty acid monoester (parts by weight) | Others (parts by weight) |
|---|---|---|---|---|---|---|
| Example 30 | a2 100 | b1 0.1 | c3 $1.0 \times 10^{-4}$ | d2 0.0097 | e2 0.0002 |  |
| Example 31 | a2 100 | b1 0.1 | c3 $1.0 \times 10^{-3}$ | d2 0.0970 | e2 0.0020 |  |
| Example 32 | a2 100 | b1 0.1 | c3 $9.9 \times 10^{-3}$ | d2 0.9703 | e2 0.0198 |  |
| Example 33 | a2 100 | b1 0.01 | c3 $1.0 \times 10^{-3}$ | d2 0.0970 | e2 0.0020 |  |
| Example 34 | a2 100 | b1 0.5 | c3 $1.0 \times 10^{-3}$ | d2 0.0970 | e2 0.0020 |  |
| Example 35 | a2 100 | b1 1.0 | c3 $1.0 \times 10^{-3}$ | d2 0.0970 | e2 0.0020 |  |
| Example 36 | a2 100 | b1 0.1 | c3 $1.0 \times 10^{-3}$ | d2 0.0989 | e2 0.0001 |  |
| Example 37 | a2 100 | b1 0.1 | c3 $1.0 \times 10^{-3}$ | d2 0.0891 | e2 0.0010 |  |
| Example 38 | a2 100 | b1 0.1 | c3 $1.0 \times 10^{-3}$ | d2 0.0495 | e2 0.0495 |  |
| Example 39 | a2 100 | b1 0.1 | c3 $1.0 \times 10^{-3}$ | d2 0.0010 | e2 0.0891 |  |
| Example 40 | a2 100 | b1 0.1 | c3 $1.0 \times 10^{-3}$ | d5 0.0970 | e3 0.0020 |  |
| Example 41 | a2 100 | b1 0.1 | c3 $1.0 \times 10^{-3}$ | d6 0.0970 | e4 0.0020 |  |
| Example 42 | a2 100 | b1 0.1 | c3 $1.0 \times 10^{-4}$ | d2 0.0979 | e2 0.0020 |  |
| Example 43 | a2 10 | b1 0.1 | c3 $4.8 \times 10^{-3}$ | d2 0.0933 | e2 0.0018 |  |
| Example 44 | a2 100 | b1 0.1 | c3 $9.1 \times 10^{-3}$ | d2 0.0891 | e2 0.0018 |  |

TABLE 9

|  | Polyacetal resin (parts by weight) | Difatty acid alkaline earth metal salt (parts by weight) | Fatty acid (parts by weight) | Fatty acid diester (parts by weight) | Fatty acid monoester (parts by weight) | Others (parts by weight) |
|---|---|---|---|---|---|---|
| Example 45 | a2 100 | b1 0.1 | c3 $1.0 \times 10^{-3}$ | d1 0.0970 | e1 0.0020 |  |
| Example 46 | a2 100 | b1 0.1 | c3 = $0.5 \times 10^{-4}$ c5 = $0.5 \times 10^{-4}$ | d1 = 0.0446 d2 = 0.0446 | e1 = 0.0005 e2 = 0.0005 |  |
| Example 47 | a2 100 | b1 0.1 | c3 = $0.5 \times 10^{-4}$ c5 = $0.5 \times 10^{-4}$ | d1 = 0.0248 d2 = 0.0248 d4 = 0.0396 | e1 = 0.0005 e2 = 0.0005 |  |
| Example 48 | a2 100 | b1 0.1 | c3 = $0.5 \times 10^{-4}$ c5 = $0.5 \times 10^{-4}$ | d1 = 0.0198 d2 = 0.0248 d3 = 0.0050 d4 = 0.0396 | e1 = 0.0005 e2 = 0.0005 |  |
| Example 49 | a2 100 | b4 0.1 | c3 $1.0 \times 10^{-3}$ | d2 0.0970 | e2 0.0020 |  |

TABLE 9-continued

|  | Polyacetal resin (parts by weight) | Difatty acid alkaline earth metal salt (parts by weight) | Fatty acid (parts by weight) | Fatty acid diester (parts by weight) | Fatty acid monoester (parts by weight) | Others (parts by weight) |
|---|---|---|---|---|---|---|
| Example 50 | a2 100 | b10 0.1 | c3 $1.0 \times 10^{-3}$ | d2 0.0970 | e2 0.0020 |  |
| Example 51 | a1 100 | b1 0.1 | c3 $1.0 \times 10^{-3}$ | d2 0.0970 | e2 0.0020 |  |
| Example 52 | a2 100 | b5 0.1 | c3 = $0.5 \times 10^{-4}$<br>c5 = $0.5 \times 10^{-4}$ | d1 = 0.0198<br>d2 = 0.0248<br>d3 = 0.0050<br>d4 = 0.0396 | e1 = 0.0005<br>e2 = 0.0005 |  |
| Example 53 | a2 100 | b5 0.1 | c3 = $0.4 \times 10^{-4}$<br>c4 = $0.2 \times 10^{-4}$<br>c5 = $0.4 \times 10^{-4}$ | d1 = 0.0198<br>d2 = 0.0248<br>d3 = 0.0050<br>d4 = 0.0396 | e1 = 0.0005<br>e2 = 0.0005 |  |
| Example 54 | a2 100 | b5 0.1 | c3 = $0.4 \times 10^{-4}$<br>c4 = $0.2 \times 10^{-4}$<br>c5 = $0.4 \times 10^{-4}$ | d1 = 0.0198<br>d2 = 0.0248<br>d3 = 0.0050<br>d4 = 0.0396 | e1 = 0.0005<br>e2 = 0.0005 | f1 = 0.3<br>g1 = 0.025 |
| Example 55 | a2 100 | b5 0.1 | c3 = $0.4 \times 10^{-4}$<br>c4 = $0.2 \times 10^{-4}$<br>c5 = $0.4 \times 10^{-4}$ | d1 = 0.0198<br>d2 = 0.0248<br>d3 = 0.0050<br>d4 = 0.0396 | e1 = 0.0005<br>e2 = 0.0005 | f1 = 0.3<br>g1 = 0.025<br>g2 = 0.3 |

TABLE 10

|  | Polyacetal resin (parts by weight) | Difatty acid alkaline earth metal salt (parts by weight) | Fatty acid (parts by weight) | Fatty acid diester (parts by weight) | Fatty acid monoester (parts by weight) | Others (parts by weight) |
|---|---|---|---|---|---|---|
| Comparative Example 13 | a1 100 |  |  | d2 0.1 |  |  |
| Comparative Example 14 | a1 100 |  | c3 $1.0 \times 10^{-1}$ |  |  |  |
| Comparative Example 15 | a1 100 | b10 0.1 |  |  |  |  |
| Comparative Example 16 | a1 100 | b10 0.1 |  | d2 0.1 |  |  |
| Comparative Example 17 | a1 100 | b10 0.1 | c3 $1.0 \times 10^{-1}$ | d2 0.003 |  |  |
| Comparative Example 18 | a1 100 | b10 0.1 |  |  | e2 0.1 |  |
| Comparative Example 19 | a1 100 |  |  |  |  |  |
| Comparative Example 20 | a1 100 |  | c3 $4.95 \times 10^{-2}$ | d2 4.8515 | e2 0.0990 |  |

TABLE 11

|  | ESCR | | Non-weld portion | | | | Weld portion | | | | Appearance of molded material |
|---|---|---|---|---|---|---|---|---|---|---|---|
|  | | | Two days after molding | | After eging | | Two days after molding | | After aging | | |
|  | Average time (sec) | Average time −20% | Tensile strength (kg/cm$^2$) | Elongation (%) | Tensile strength (kg/cm$^2$) | Elongation (%) | Tensile strength (kg/cm$^2$) | Elongation (%) | Tensile strength (kg/cm$^2$) | Elongation (%) | |
| Example 30 | 7100 | 0/30 | 589 | 32 | 594 | 32 | 568 | 24 | 540 | 21 | No defect |
| Example 31 | 7500 | 0/30 | 592 | 31 | 592 | 33 | 567 | 24 | 542 | 22 | No defect |
| Example 32 | 7700 | 0/30 | 591 | 32 | 593 | 33 | 568 | 26 | 542 | 21 | No defect |
| Example 33 | 7100 | 0/30 | 591 | 31 | 591 | 33 | 567 | 25 | 541 | 22 | No defect |
| Example 34 | 7500 | 0/30 | 590 | 33 | 590 | 33 | 566 | 24 | 543 | 21 | No defect |
| Example 35 | 7800 | 0/30 | 589 | 32 | 591 | 33 | 565 | 25 | 521 | 20 | No defect |
| Example 36 | 7700 | 0/30 | 590 | 32 | 593 | 33 | 567 | 25 | 540 | 20 | No defect |

TABLE 11-continued

|  | ESCR | | Non-weld portion | | | | Weld portion | | | | |
|---|---|---|---|---|---|---|---|---|---|---|---|
|  | | | Two days after molding | | After eging | | Two days after molding | | After aging | | |
|  | Average time (sec) | Average time −20% | Tensile strength (kg/cm²) | Elongation (%) | Tensile strength (kg/cm²) | Elongation (%) | Tensile strength (kg/cm²) | Elongation (%) | Tensile strength (kg/cm²) | Elongation (%) | Appearance of molded material |
| Example 37 | 7900 | 0/30 | 592 | 31 | 592 | 32 | 565 | 25 | 541 | 20 | No defect |
| Example 38 | 7900 | 0/30 | 590 | 30 | 591 | 31 | 564 | 24 | 520 | 20 | No defect |
| Example 39 | 8000 | 0/30 | 590 | 31 | 590 | 31 | 563 | 25 | 520 | 20 | No defect |
| Example 40 | 7800 | 0/30 | 590 | 32 | 592 | 31 | 563 | 24 | 521 | 20 | No defect |
| Example 41 | 7500 | 0/30 | 591 | 31 | 591 | 33 | 565 | 24 | 522 | 21 | No defect |
| Example 42 | 7600 | 0/30 | 590 | 33 | 590 | 33 | 566 | 24 | 542 | 21 | No defect |
| Example 43 | 7600 | 0/30 | 589 | 32 | 591 | 33 | 565 | 26 | 540 | 20 | No defect |
| Example 44 | 7800 | 0/30 | 586 | 29 | 593 | 28 | 560 | 24 | 520 | 19 | No defect |
| Example 45 | 7500 | 0/30 | 590 | 32 | 593 | 33 | 568 | 25 | 540 | 21 | No defect |
| Example 46 | 7600 | 0/30 | 592 | 31 | 592 | 33 | 567 | 28 | 545 | 23 | No defect |
| Example 47 | 7600 | 0/30 | 591 | 32 | 593 | 33 | 568 | 28 | 546 | 23 | No defect |
| Example 48 | 7800 | 0/30 | 592 | 32 | 592 | 32 | 565 | 28 | 546 | 24 | No defect |
| Example 49 | 8100 | 0/30 | 591 | 32 | 590 | 32 | 562 | 29 | 540 | 24 | No defect |
| Example 50 | 7900 | 0/30 | 591 | 31 | 587 | 29 | 559 | 27 | 520 | 22 | No defect |
| Example 51 | 7700 | 0/30 | 591 | 30 | 588 | 27 | 560 | 24 | 524 | 20 | No defect |
| Example 52 | 8500 | 0/30 | 592 | 33 | 590 | 33 | 567 | 29 | 545 | 24 | No defect |
| Example 53 | 9000 | 0/30 | 591 | 33 | 590 | 34 | 566 | 29 | 566 | 26 | No defect |
| Example 54 | 8700 | 0/30 | 591 | 33 | 591 | 33 | 565 | 27 | 565 | 24 | No defect |
| Example 55 | 8800 | 0/30 | 593 | 32 | 593 | 33 | 565 | 28 | 565 | 25 | No defect |

TABLE 12

|  | ESCR | | Non-weld portion | | | | Weld portion | | | | |
|---|---|---|---|---|---|---|---|---|---|---|---|
|  | | | Two days after molding | | After eging | | Two days after molding | | After aging | | |
|  | Average time (sec) | Average time −20% | Tensile strength (kg/cm²) | Elongation (%) | Tensile strength (kg/cm²) | Elongation (%) | Tensile strength (kg/cm²) | Elongation (%) | Tensile strength (kg/cm²) | Elongation (%) | Appearance of molded material |
| Comparative Example 13 | 2900 | 1/30 | 589 | 32 | 576 | 25 | 568 | 20 | Impossible to measure | | No defect |
| Comparative Example 14 | 3100 | 0/30 | 592 | 31 | 567 | 24 | 567 | 20 | Impossible to measure | | No defect |
| Comparative Example 15 | 4000 | 2/30 | 591 | 32 | 593 | 33 | 568 | 19 | 485 | 6 | Changed to light brown |
| Comparative Example 16 | 3600 | 1/30 | 591 | 31 | 591 | 33 | 567 | 20 | 496 | 8 | Changed to light brown |
| Comparative Example 17 | 5100 | 0/30 | 590 | 33 | 590 | 33 | 566 | 19 | 492 | 7 | Changed to light brown |
| Comparative Example 18 | 3800 | 2/30 | 589 | 32 | 591 | 33 | 565 | 20 | 494 | 7 | Changed to light brown |
| Comparative Example 19 | 2300 | 1/30 | 590 | 32 | 573 | 20 | 567 | 18 | Impossible to measure | | No defect |
| Comparative Example 20 | 3000 | 3/30 | 592 | 31 | 562 | 24 | 565 | 20 | Impossible to measure | | No defect |

What is claimed is:

1. A polyacetal resin composition comprising 100 parts by weight of a polyacetal resin (A); 0.001 to 1.0 part by weight of a difatty acid alkaline earth metal salt (B), produced using two or more kinds of fatty acids and an alkaline earth metal; and $1 \times 10^{-6}$ to $1 \times 10^{-1}$ part by weight of a fatty acid (C).

2. A polyacetal resin composition according to claim 1, wherein the weight ratio (C/B) of the fatty acid (C) and the difatty acid alkaline earth metal salt (B) is 0.1/100 to 10/100.

3. A polyacetal resin composition according to claim 1, wherein the fatty acid (C) is a combination of two or more kinds of fatty acids.

4. A polyacetal resin composition according to claim 1, wherein the fatty acid (C) is a combination of at least one kind of fatty acid having odd-number carbon atoms and at least one kind of fatty acid having even-number carbon atoms and the weight ratio (C1/C2) of the total weight (C1) of the fatty acid having odd-number carbon atoms and the total weight (C2) of the fatty acid having even-number carbon atoms is 0.1/99.9 to 99.9/0.1.

5. A polyacetal resin composition according to claim 1, wherein the fatty acid (C) is selected from at least one kind of the fatty acids used in production of the difatty acid alkaline earth metal salt (B).

6. A polyacetal resin composition according to claim 1, wherein the fatty acids of the difatty acid alkaline earth metal salt (B) are a combination of at least one kind of fatty acid having even-number carbon atoms and at least one kind of fatty acid having odd-number carbon atoms and the weight ratio (B1/B2) of the total weight (B1) of the fatty acid having even-number carbon atoms and the total weight (B2) of the fatty acid having odd-number carbon atoms is 0.1/99.9 to 99.9/0.1.

7. A polyacetal resin composition according to claim 1, wherein the metal moiety of the difatty acid alkaline earth metal salt (B) is calcium and, the fatty acid moiety of the difatty acid alkaline earth metal salt (B) is at least two kinds of fatty acids selected from the group consisting of lauric acid, tridecylic acid, myristic acid, pentadecylic acid, palmitic acid, heptadecylic acid, stearic acid, nonadecanoic acid, arachic acid and behenic acid.

8. A polyacetal resin composition according to claim 1, further comprising a fatty acid diester compound (D) represented by the following general formula (I) and a fatty acid monoester compound (E) represented by the following general formula (II):

$$R_1-COO(R_3O)_n-COR_2 \tag{I}$$

wherein $R_1$ and $R_2$ may be the same or different and are each an alkyl group, an alkenyl group, an alkyl group substituted with one hydroxyl group or an alkenyl group substituted with one hydroxyl group, and wherein each alkyl or alkenyl group contains 9 to 35 carbon atoms; $R_3O$ is an alkylene glycol unit containing 2 to 6 carbon atoms; and n is an integer of 1 to 70, $$R_4-COO(R_5O)_m-H \tag{II}$$

wherein $R_4$ is an alkyl group, an alkenyl group, an alkyl group substituted with one hydroxyl group or an alkenyl group substituted with one hydroxyl group, and wherein each alkyl or alkenyl group contains 9 to 35 carbon atoms; $R_5O$ is an alkylene glycol unit containing 2 to 6 carbon atoms; and m is an integer of 1 to 70.

9. A polyacetal resin composition according to claim 8, wherein the total amount of the fatty acid diester compound (D) and the fatty acid monoester compound (E) is 0.005 to 3.0 parts by weight per 100 parts by weight of the polyacetal resin and the weight ratio (D/E) of the fatty acid diester compound (D) and the fatty acid monoester compound (E) is 99.9/0.1 to 0.1/99.9.

10. A polyacetal resin composition according to claim 1, wherein the amount of formaldehyde gas generated when the polyacetal resin composition is heated at 230° C. for 50 minutes in a nitrogen atmosphere is 500 ppm or less.

11. A gear molded article comprising a polyacetal resin composition set forth in claim 1.

* * * * *